US012002277B2

(12) United States Patent
Uhlemann

(10) Patent No.: US 12,002,277 B2
(45) Date of Patent: Jun. 4, 2024

(54) WIRELESS NETWORK WITH AWARENESS OF HUMAN PRESENCE

(71) Applicant: MaxLinear, Inc., Carlsbad, CA (US)

(72) Inventor: Stefan Uhlemann, Munich (DE)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 17/657,094

(22) Filed: Mar. 29, 2022

(65) Prior Publication Data

US 2022/0222960 A1 Jul. 14, 2022

Related U.S. Application Data

(63) Continuation of application No. 15/638,935, filed on Jun. 30, 2017, now Pat. No. 11,288,497.

(51) Int. Cl.

| | |
|---|---|
| ***G06V 40/10*** | (2022.01) |
| ***G07C 9/00*** | (2020.01) |
| ***H04L 43/0876*** | (2022.01) |
| ***H04L 47/10*** | (2022.01) |

(52) U.S. Cl.

CPC .......... *G06V 40/10* (2022.01); *H04L 43/0876* (2013.01); *H04L 47/10* (2013.01); *G07C 9/00* (2013.01)

(58) Field of Classification Search

None

See application file for complete search history.

(56) References Cited

U.S. PATENT DOCUMENTS

| | | | | |
|---|---|---|---|---|
| 9,253,733 | B1 * | 2/2016 | Lee | H04W 52/283 |
| 10,380,880 | B1 * | 8/2019 | Darling | G08B 25/016 |
| 11,288,497 | B2 | 3/2022 | Uhlemann | |
| 2016/0365886 | A1 * | 12/2016 | Prendergast | H04W 52/18 |
| 2017/0192478 | A1 * | 7/2017 | Mercer | G01D 5/142 |
| 2017/0279186 | A1 * | 9/2017 | Xia | H01Q 1/245 |
| 2018/0350213 | A1 * | 12/2018 | Bart | H04N 7/186 |

FOREIGN PATENT DOCUMENTS

| | | | | | |
|---|---|---|---|---|---|
| CN | 102570051 | B | * | 7/2014 | H04B 1/3838 |
| CN | 106773844 | A | | 5/2017 | |
| CN | 106773844 | A | * | 5/2017 | |
| CN | 206302577 | U | * | 7/2017 | |
| CN | 206302577 | U | | 7/2017 | |
| CN | 107005951 | A | | 8/2017 | |
| CN | 107005951 | A | * | 8/2017 | H04B 1/3838 |
| LU | 93233 | B1 | * | 4/2018 | B60R 16/03 |
| TW | 201626884 | A | * | 8/2016 | |

(Continued)

OTHER PUBLICATIONS

Ricci, F. "An Introduction to Wireless Technologies, Part 1." 2010/2011. 56 pages.

(Continued)

*Primary Examiner* — Mohammed Rachedine

(74) *Attorney, Agent, or Firm* — Buchalter; Jason W. Croft

(57) ABSTRACT

An apparatus including a wireless component configured for wireless communication in view of a set of wireless parameters and one or more processors configured to determine whether a biological presence is within a proximity based on a set of predetermined criteria and modify the set of wireless parameters in response to the biological presence being detected within the proximity.

20 Claims, 12 Drawing Sheets

100
124
104
122
108
132
134
116
118
120
136
106
102
114
110
I
II
III
(1)
(2a)
(2b)
(3)
(4)
(5)
(6)
(7)
(8)
(10)
(11)

(56) References Cited

FOREIGN PATENT DOCUMENTS

| | | | |
|---|---|---|---|
| WO | 2018120240 A1 | | 7/2018 |
| WO | WO-2018120240 A1 | * | 7/2018 |

OTHER PUBLICATIONS

Jardosh. Amit P. et al. "Green WLANs: On-demand WLAN Infrastructures." 26 pages.

Aftab, Farooq et al. "Light Fidelity (LI-FI) Based Indoor Communication System." International Journal of Computer Networks & Communications (IJCNC) vol. 8, No. 3, May 2016. 11 pages.

Sewaiwar, Atul et al. "3-Gbit/s Indoor Visible Light Communications Using Optical Diversity Schemes." IEEE Photonics Journal, vol. 7, No. 6, Dec. 2015. 10 pages.

Palacios, F'(aul et al. "An Energy-efficient Point Coordination Function Using Bidirectional Transmissions of Fixed Duration for Infrastructure IEEE 802.11 WLANs." IEEE ICC 2013—Communication QoS, Reliability and Modeling Symposium. 6 pages.

"ICNIRP Guidelines for Limiting Exposure to Time-Varying Electric, Magnetic and Electromagnetic Fields (up to 300 GHz)." International Commission on Non-Ionizing Radiation Protection. 1998. 34 pages.

Muthukrishnan, Kavitha et al. "Sensing motion using spectral and spatial analysis of WLAN RSSI." 16 pages.

Gong, Liangyi et al. "WiFi-Based Real-Time Calibration-Free Passive Human Motion Detection." Sensors 2015. 17 pages.

"Wi-Fi: Overview of the 802.11 Physical Layer and Transmitter Measurements." Tektronix. 44 pages.

* cited by examiner

WIRELESS NETWORK WITH AWARENESS OF HUMAN PRESENCE

CROSS-REFERENCE TO RELATED APPLICATIONS

This application is a continuation of U.S. patent application Ser. No. 15/638,935, filed Jun. 30, 2017, titled WIRELESS NETWORK WITH AWARENESS OF HUMAN PRESENCE, which is incorporated herein by reference in its entirety.

FIELD

The present disclosure is in the field of wireless communications, and more specifically, pertains to responding to the awareness of a human presence in wireless communications.

BACKGROUND

The need for network connectivity in private as well as in enterprise environments, leads to an ever increasing number of network elements, many of them using a wireless modem connection to exchange data with servers or other clients. The wireless modems comprise user equipments (UEs), Internet of Things (IoT) devices, routers, network storage, Smart TVs, as well as other portable/wireless electronics. In particular, these devices are mostly designed to achieve highest data rates on shared spectrum wireless channels.

The human user of such wireless technologies is often exposed to wireless energy transmitted by all the client devices nearby. Despite the fact that the biological effects of the emitted radio frequency (RF) power to humans is mostly considered harmless, a part of user concerns and preferences include minimizing the exposure to high frequency electromagnetic fields. As such, a wireless network, especially a home network, can be created that performs well and at the same time reduces the RF energy for humans working and living in the same network environment to greater ensure biological safety.

DETAILED DESCRIPTION

Figure 1:
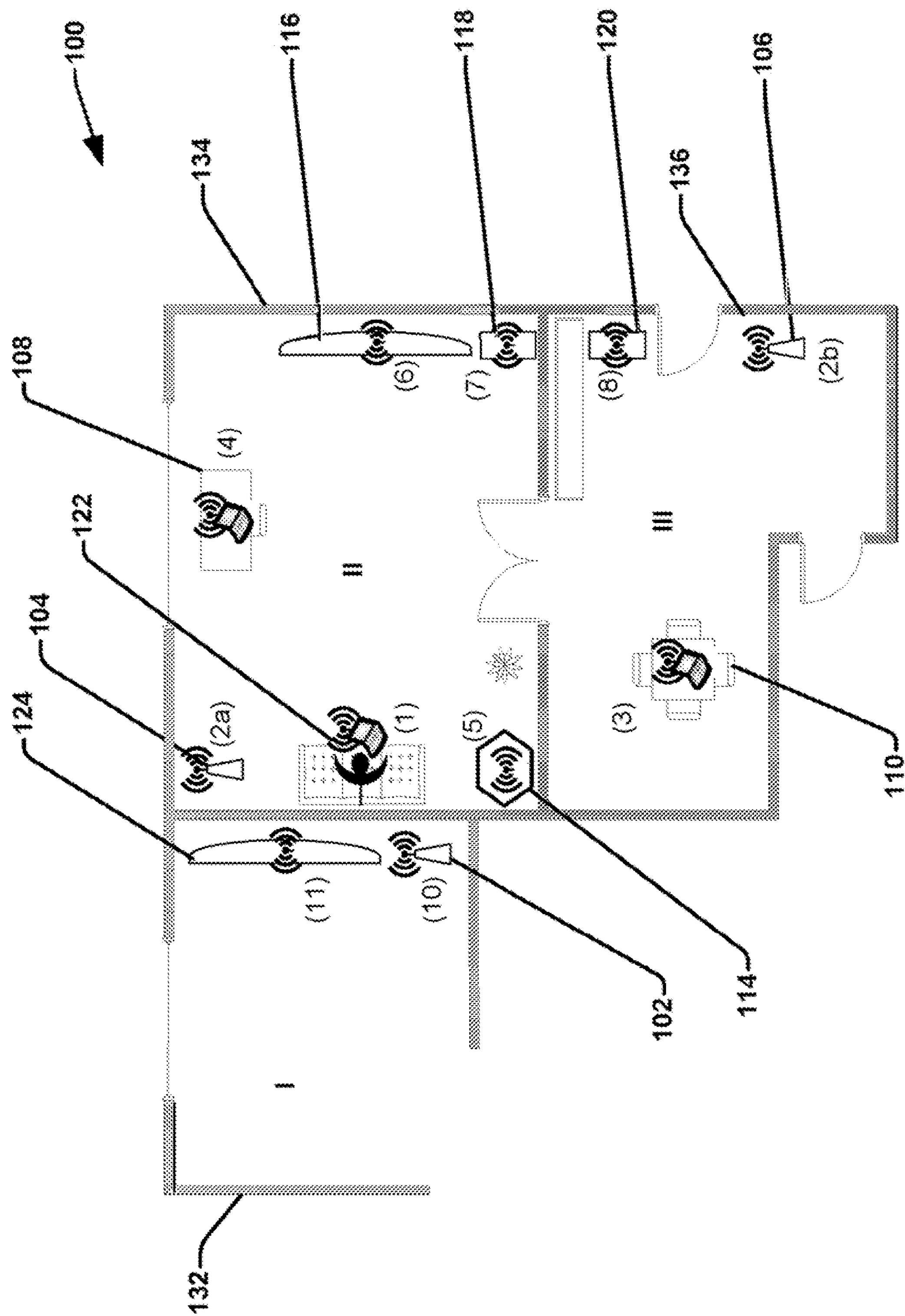
FIG. 1 illustrates a block diagram of an example wireless network environment with network devices according to various aspects or embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can be grouped to form another component, either of which can be localized in one computing device, or be physical distributed between two or more computing devices. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

INTRODUCTION

In consideration of described deficiencies of network connectivity and operations, various aspects or embodiments enable network devices to decide whether a biological entity, biological presence (e.g., a human entity/presence) is located within a certain distance, proximity or vicinity with respect to or from a wireless modem/router, or other network device facilitating communications with a network. As such, embodiments/aspects herein illustrate how a wireless network can be created, that performs well and at the same time reduces the RF energy for humans working and living in the same environment.

In an aspect, wireless modems can detect the physical presence of a human or biological entity and react accordingly in order to lessen the radio frequency (RF) energy in the network environment. An apparatus or device can be employed in a network device such as a modem or router device. The apparatus can be configured to include one or more components or processors configured to determine whether a biological presence is within a proximity based on a set of predetermined criteria. These criteria can include a distance, optical property or differential/change, a motion property or differential, an audio property or differential, a received power signal (e.g., a received signals strength indicator (RSSI), SNR or the other power signal measurement), a received communication message, an awake message, a temperature differential, as well as a distance of the biological presence. The criteria can further include a physical interaction with a human or biological entity with an apparatus or device or a user device associated with the human or biological entity and an interaction with the apparatus or device.

The modem, for example, can modify or change one or more parameters when the biological presence or entity is detected or when the biological presence is determined to be a human biological entity, for example. The network parameter/modem parameter/physical layer parameter can include, for example, a transmission property of a physical layer, a communication standard, a frequency band, an amount of airtime, a directivity pattern, or a physical connection. A transmission property can be a total amount of data to be transferred, an upper time bound for execution, or a minimum transmission rate as related to a wireless activity, as well as different forms of energy.

For example, the modem can modify a transmission property to communication from RF communications to an optical form of communication of data between the network device and a user device in response to the biological presence being detected. For example, the network device can provide an alternative communication path comprises a visible light communication (VLC) configured to transmit data in lieu of the radio frequency interface.

The modification of the parameters can be performed as a function of a predetermined threshold of an RF energy within the vicinity to operate or ensure less RF energy that could potential affect the biological present or entity otherwise. A radio frequency interface can be further configured to receive or transmit data over a radio interface to supplement or enable any RF or VLC communication.

Alternatively or additionally, other forms of energy can be utilized in communications to contribute to the reduction in RF energy. For example, the energy form can be electrical in a wired connection or be a parameter can be a different standard that enables less RF energy to be emitted, such as by a power line communication, or other similar different form or standard use for communicating data. Additional aspects, embodiments or details of the disclosure are further described below with detail in reference to figures.

FIG. 1 illustrates a network environment within a home area in accordance with various embodiments or aspects. Various wireless clients, or network devices are illustrated to provide an example scenario.

Three rooms 130-134 are illustrated with various network devices such as wireless modems, respectively. In the example, room I 130 can belong to a different home-networking environment/user than rooms II 132 and Ill 134; however, each room can belong to a different network or one network as managed by one or more network devices such as an access point, modem, router, or other similar network device.

The network environment 100 can include wireless access points 102, 104, and 106 in the rooms 130-134, respectively. A user, for example, can operate a user device or a wireless network device 122, which can comprise a laptop computer, for example, or any other device that can operate to communicate via a network associated with access points 102-106. Other portable wireless devices like tablets or smartphones 108, 110 can be positioned in rooms II 132 and Ill 134. Stationary wireless devices, for example, can also be included as network devices such as devices 114-124. Such network devices 114-124, for example, can be Smart-TVs (e.g., devices 116 and 124), Home Theater systems (e.g., device 118), wireless network attached storage (NAS) 114, digital assistants 120 like Amazon Echo, etc. The wireless network can be a part of a residential environment, an office building, factory, or any other environment or premise. The objective of minimizing RF stress for humans working or living in the same space can remain the same.

Figure 2:
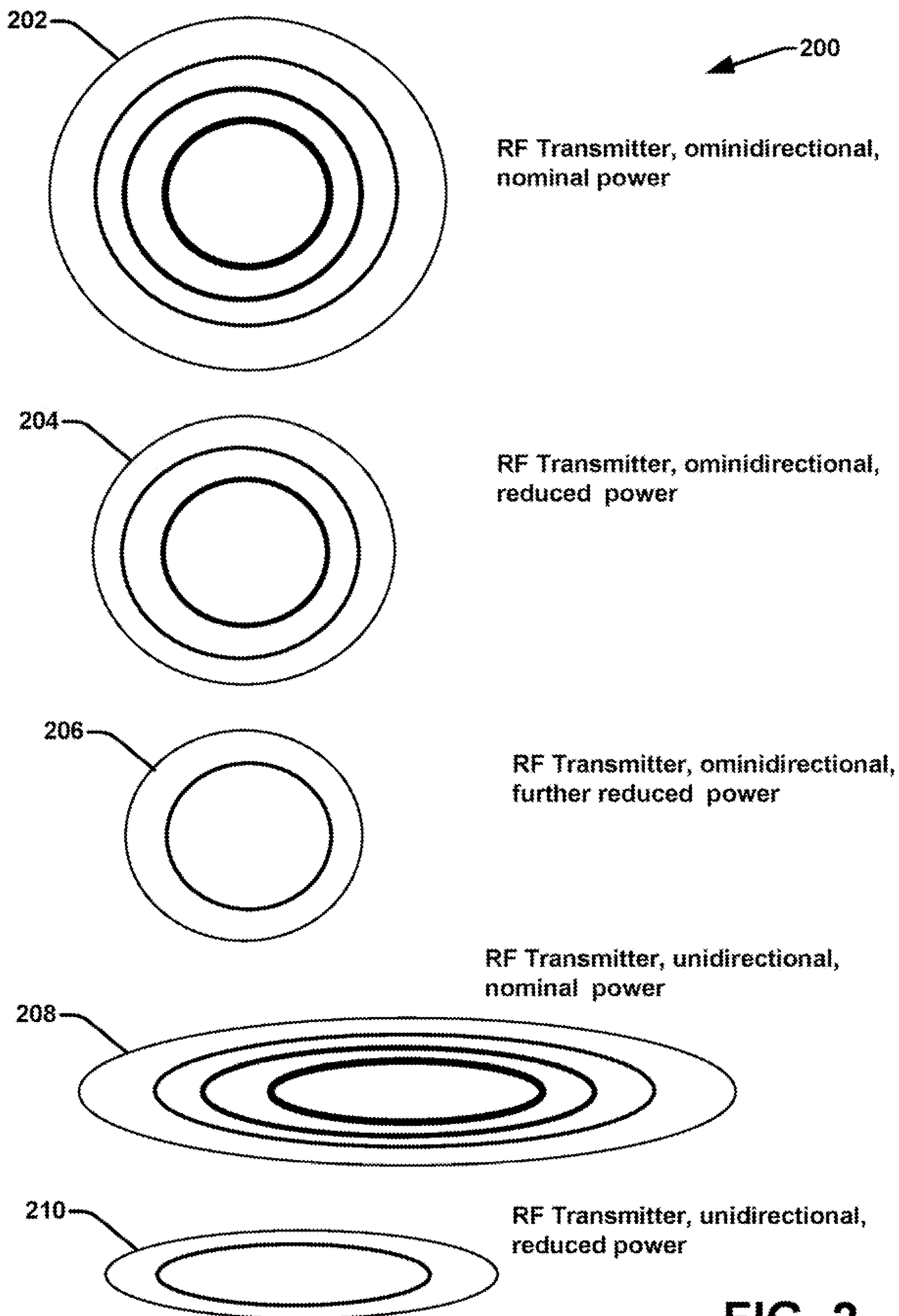
FIG. 2 illustrates a legend for radio frequency (RF) field distributions for various aspects or embodiments herein.

FIG. 2 illustrates a legend illustrating for representation herein various distribution of RF fields 200 for further illustration. It should be noted that real-life field distributions can be even more complex and further depend on the properties of the antennas, the reflection of RF signals on different surfaces, the attenuation in various media (walls) or other factors or parameters as well.

For example, the distribution field 202 can reference an RF transmitter/transmission that is omnidirectional with a nominal power (or nominal RF energy). The distribution field 204 can reference an RF transmitter/transmission that is omnidirectional with a reduced or less power (or RF energy) than the nominal power. The distribution field 206 can reference an RF transmitter/transmission that is omnidirectional with an even lower power (or RF energy) than distribution fields 204 or 202. The distribution field 208 can reference an RF transmitter/transmission that is unidirectional/one directional with a nominal power, while the distribution field 210 can reference an RF transmitter/transmission that is unidirectional with a reduced or less power (or RF energy) than the nominal power.

Figure 3:
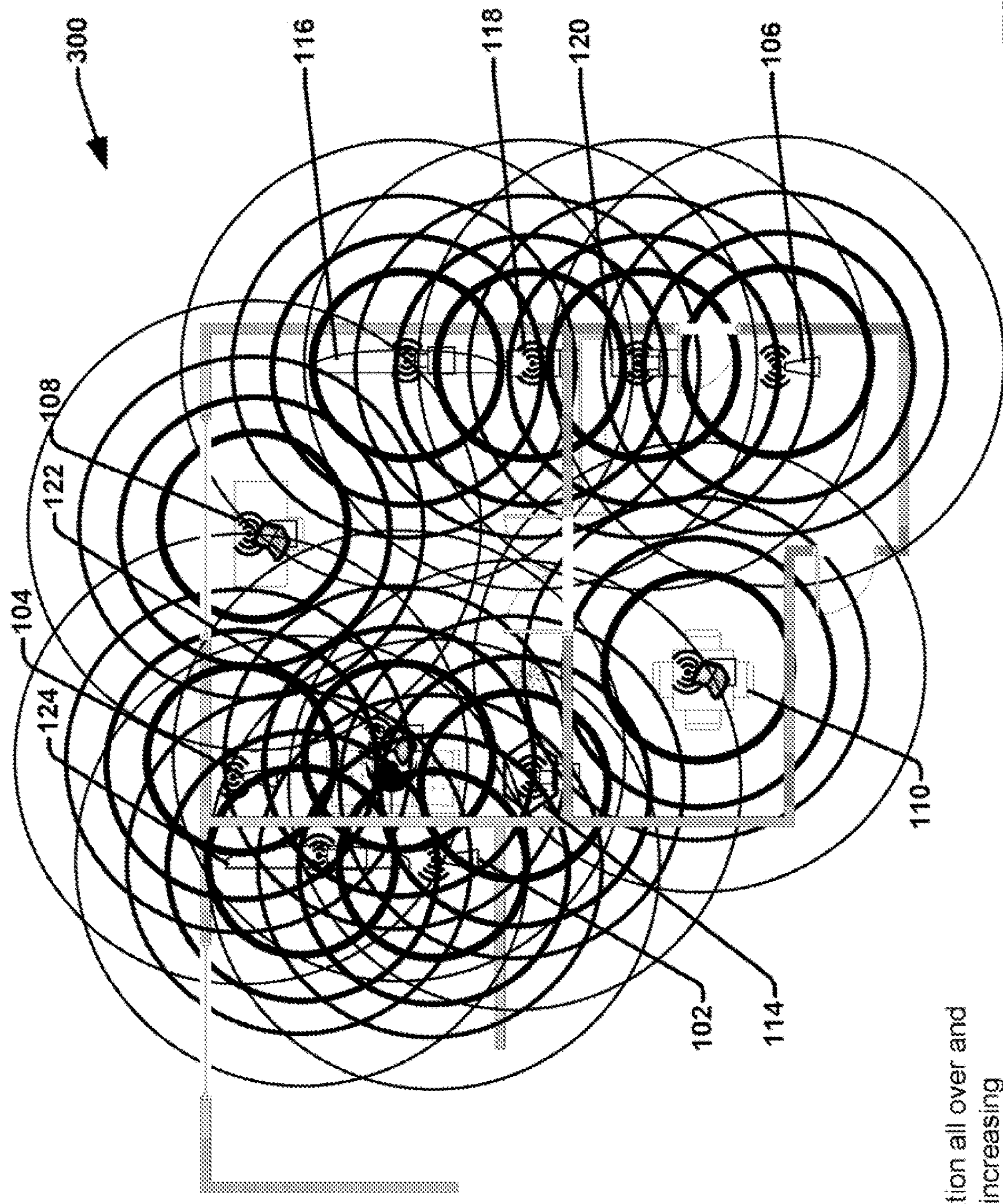
FIG. 3 illustrates another block diagram of an example wireless network environment with network devices according to various aspects or embodiments.

FIG. 3 further illustrates an example wireless network environment 300 demonstrated various network devices, including user devices 122, 108, 110, 116-124 (e.g., UEs, tablets, smart phone, smart-TVs, home theaters systems, wireless NAS, digital assistants, stationary or non-stationary devices, or other network devices configured to communicatively couple to a wireless network) and wireless network devices 102, 104, 106 (e.g., one or more access points, base stations, routers, modems, or other network devices configured to enable user devices to communicatively couple to a wireless network) enabling an environment of RF field distributions 202-210 from RF energy that can potentially radiate or affect biological tissues. Additionally, with an ever increasing number of network connected devices the risk for exposure at near harmful levels can also be ever increasing.

In particular, the RF energy/transmission/distribution fields within a network environment could potentially be high enough at some point to cause a biological effect from electromagnetic fields induced by RF energy. The biological effect of electrical and magnetic fields with low energy has been subject of many publications. The publications can be categorized, for example, as long-term epidemiological studies, measurements with human test persons (EEG (electroencephalography), ECG (electrocardiogram), etc.), as well as experiments with cell cultures. Even for effects caused by low frequency magnetic fields (mains/rail power systems), which have been under scientific investigation for more than 60 years, the debate is not necessarily closed. However, effects on the biology of organisms are clearly proven. In particular, for high-frequency (RF) fields as they are created by wireless communication and network technologies, the effect of dielectric heating of organic material is commonly used to define an acceptable upper limit for the RF fields a human can be exposed to. A specific absorption rate (SAR) has been defined for this purpose. A whole-body SAR limit of 0.08 W/kg could be derived, for example. The non-thermal effects of high-frequency fields are more difficult to judge and literature does not present a common conclusion.

In one example, a single IEEE 802.11 wireless LAN modem (e.g., access points 102, 104, 106) can transmit with up to about 19 dBm (79 mW), which is well below the above SAR limit, even if the entire radiation would be absorbed by one human. However, for IEEE 802.3 a/h transmitters in outdoor environments, the transmit power can be up to 36 dBm (4 W) (not for private use). With an increasing number of wireless clients sharing the spectrum, the total energy consumed and thus the total RF energy transmitted by the modems, increases. The system energy consumption per bit can be shown as a function of the number of clients or user devices. Doubling the number of clients approximately also doubles the energy required to transmit the same amount of data. However, more clients also lead to an increase of the total data volume, thus the effective increase in energy consumption and radiated RF energy grows exponentially with the number of clients. Considering the still ongoing medical research and a multitude of transmitters, a source of concern can be justified, and thus, technology with reduced radiation can easily turn into a compelling argument for ensuring safety. Despite this simplification, a state-of-the art network today does not change the emission of RF energy in a dynamic manner based on whether a user or biological entity being present or not. As a consequence, a user can be exposed to radiation from all RF sources. The term biological presence can refer to a human or any other biological entity, or biological presence detected within a certain proximity or distance threshold from a network device (e.g., e.g., access points/modems/routers 102, 104, 106).

In particular, for those concerned about electromagnetic RF fields, there is today hardly any option to eliminate exposure other than minimizing the number of wireless devices and using them only on-demand. Various proposals can be made to mitigate such exposure. Some examples means to mitigate RF fields can include manually turning off the wireless LAN (802.11) during all phases without network need, a pre-scheduled de-activation of wireless networks (e.g. during night, or other times when demand is lower), using wireline networking technologies (e.g., wired Ethernet or otherwise) when possible, keeping wireless access points at a distance, or negotiating comparable actions with the direct neighbors or neighboring devices. Further, dedicated software/firmware solutions can be implemented for commercial WLAN routers, which allow the user to control the emitted RF energy by constraining the transmit power and idle activity. However, these measures either compromise data-rate or are not very practical. None of them reacts in an adaptive fashion to the presence of humans or a biological presence in consideration of safety thresholds as networks continue to grow in the number of devices and power usage.

Figure 4:
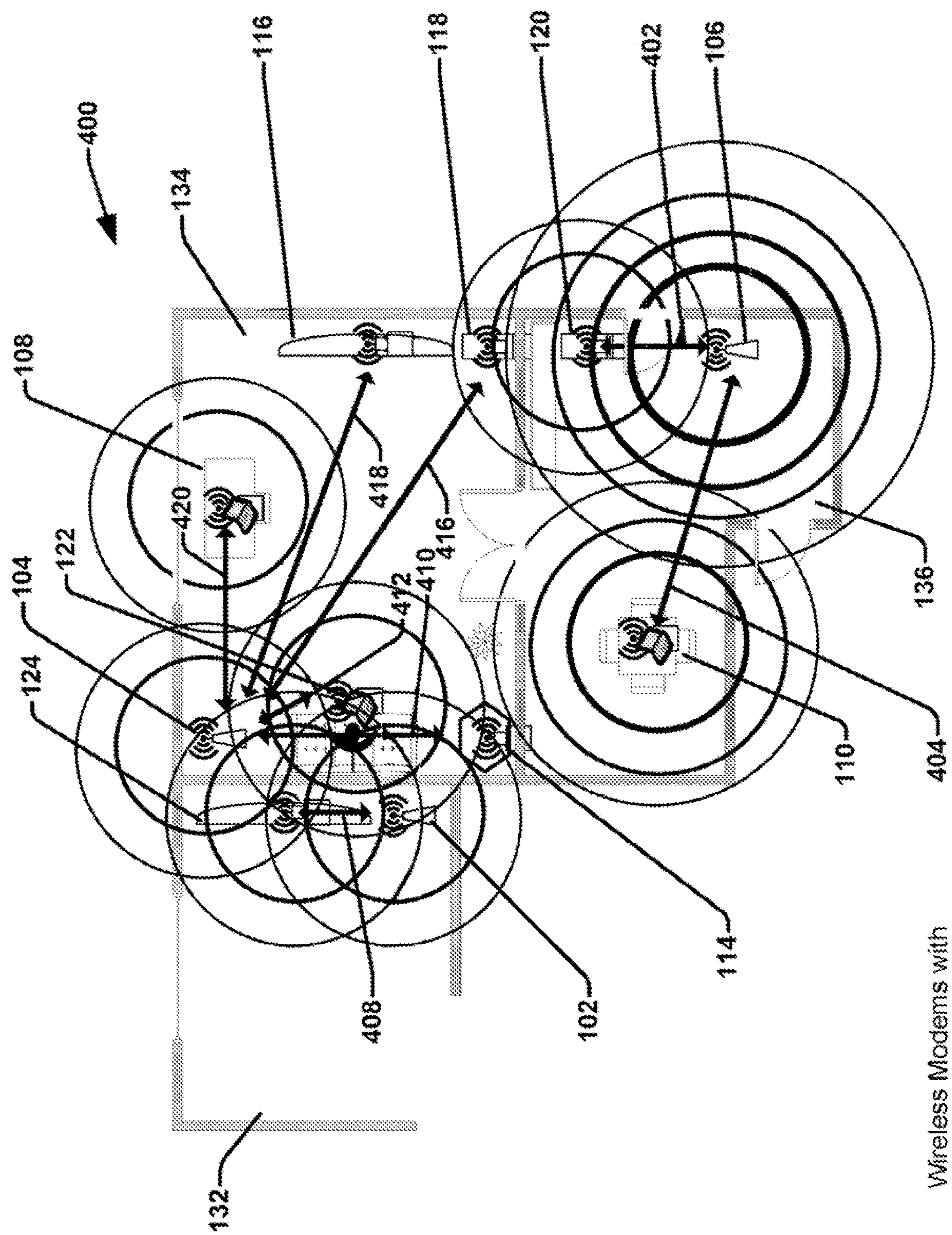
FIG. 4 illustrates another block diagram of an example wireless network environment with network devices according to various aspects or embodiments.

FIG. 4 illustrates another example network environment 400 with various network devices configured to reduce the total RF energy and field distribution in response to detection of a biological or human presence. The steadily increasing wireless communication makes it more and more unlikely, to have longer phases without activity within wireless networks, especially in-home or office networks (e.g., WiFi, WLAN, or other area networks). Modern services, cloud computing, sensor networks, and the like can contribute to the wireless traffic. More intelligent schemes are thus in demand to reduce the RF fields that humans are exposed to.

In one aspect, a Green WLAN can operate to minimize energy consumption of a WLAN network. As a side effect, the exposure of humans to electromagnetic RF fields can be reduced as well. For example, a policy driven resource on demand strategy for high-density WLANs can be utilized as part of a Green WLAN to accomplish in part the objective of decreasing RF fields or energy within a network environment. These processes can be based on a-priori knowledge of the physical positions of all WLAN access points (AP) (e.g., network devices 102, 104, 106) and collect user and usage statistics to intelligently manage power states of the access points. The reduction of the transmit power for nearby clients/user devices can be performed such that clients nearer/within a predefined distance can have the transmit power lowered/lower compared to another set of clients/user devices within a network boundary distance but outside of this predefined distance.

Wireless networks can perform one or more options to reduce the total amount of RF energy being transmitted. These options can include: choosing the optimum fragmentation size of data packets, choosing lower transmission power, reducing the re-try count for ARO (number of retransmissions), directivity patterns, or beamforming operations.

In other aspects, indoor localization can offer the information to control a wireless network such that it deliberately reduces RF fields in certain areas of the network. In order to do so, indoor localization is based on being configured or able to identify objects with an accuracy of a predefined distance (e.g., about one meter or better) in a typical home or office environment. Indoor localization technology can be based on time (difference) of arrival estimation (TDOA) or receive signal strength (RSS) measurements (e.g., an RSS indicator (RSSI)) between multiple wireless stations or APs (e.g., network devices 102, 104, 106). Some drawbacks to utilizing indoor localization processes alone can include that a line-of-sight connection between the involved stations could possibly not exist, and thereby cause a multipath transmission degrading the accuracy of measurements. The characteristics of the room environment may not be always predictable and can even change (e.g., via/by reflections). As a result, commercial indoor location for residential- or office-environments could be restricted to room level accuracy. For example, while it can be possible to determine, if an object is inside a room 132-136, but more difficult to determine where inside the room 132-136.

In other aspects, a network device 102-106 can operate to alter the RF energy or RF distribution fields within the network environment in response to a detection of a biological presence (e.g., a human presence or presence of a biological entity) by enabling an alternative communication path with less RF energy. This alternative communication path, for example, can include a visible light communication (VLC), a power line communication, a different standard (e.g., Zigbee, Bluetooth, etc.) of a communication from an existing standard, a wired communication line (e.g., an Ethernet connection from a wireless connection or other type of cable or connection), or one interface to another interface (e.g., a radio frequency interface, a VLC interface, or other communication interface, either wired or wireless, from one AP/modem/network device to another by offloading or handover processes).

In one example, the connections 402-420 can be changed among network devices, as well as the nature or parameters of any particular connection 402-420 could be changed according to these particular alternative communication paths to reduce the amount of RF fields or RF energy within a particular vicinity in addition or alternatively to other mitigating operations/aspects/embodiments described herein, such as changing a connection network device or modem 102 to another 104, for a particular RF device, for example as a handover or offloading operation that can be initiated by the user device 108-124 or the AP/modem/router or managing network device 102-106, for example.

In an embodiment, a network device 102-106 (e.g., as a modem or router or the like) can receive data via the radio frequency interface and transmit via data (e.g., as a downlink communication) to a user device 108-124 in a VLC communication utilizing an optical interface with LED or other light source in a pattern to convey data. The IEEE 802.15.7 can enable standardizing technology that enables communication at higher data rates using various VLC sources. Despite various practical and commercial challenges, VLC can enable network connectivity without emitting RF fields (other than light). Compared to IEEE 802.11 WLAN and alike (Z-Wave, ZigBee, Bluetooth, or other standardized communications), VLC is not considered to have an adverse effect on humans. Visible light is part of our natural environment and its intensity is directly "visible". If VLC is combined with regular indoor light-sources, its presence does not make much difference.

In other embodiments/aspects, the network environment 400 can enable a reduction in the amount of total RF energy or RF fields as opposed to the environment 300 of FIG. 3 when one or more network devices 102-106 are configured to dynamically alter the RF fields in various ways in combination or individually as discussed herein.

In other aspects/embodiments, wireless modems 102-106, for example, can obtain an awareness of the presence of a human in close proximity to the modem. For example, the network devices 102-106 can detect whether a biological presence is within a certain defined proximity or vicinity of a room within the boundaries of the network based on a set of predetermined criteria, which can comprise an optic differential (as a property/parameter change), a motion differential, an audio differential, a received power signal, a received communication message, an awake message, a user activity (e.g., a communication signal, operation of a user device, associated keyboard, mouse touchpad, touchscreen or any other user-interface interaction detectable over a network), a temperature differential, or a distance of the biological presence associated with the optic differential, the motion differential, the audio property, or the temperature differential, for example.

Additionally or alternatively, the network devices 102-106 can operate to further discern whether a biological presence or entity is a human entity. For example, the set of predetermined criteria could be utilized to determine a particular size of a change or difference within any one of the properties or parameters associated with the predetermined criteria as a means for discerning a human presence over another type of biological presence (e.g., pet, bug, plant, etc.). For example, an optical change can be associated with an optical property or parameter (e.g., an intensity change) of a defined amount or size, as with any of the other predetermine criteria, such that a certain size of a change could be associated with a larger being as present within the vicinity or proximity of the network device. For example, a large amount of optical difference (e.g., intensity, dispersion, wavelength, reflection, absorption, or other optical property change) beyond or below a certain threshold could indicate a human over a pet, a plant or other organism. As such, if a total RF energy or field distribution among the current vicinity or proximity is above a predetermined threshold at time of the detection of a biological presence or a human presence, then the RF energy could be lowered according to any number of aspects or embodiments discussed herein by modifying or adjusting modem parameters or other factors associated RF energy being produced by the particular network device or modem.

In other aspects, network devices 102-106 incorporating wireless modems have a concept or idea of requirements towards data-rate, and thus, based on a detection of a presence of a human or biological entity and the required service (e.g., a quality of service (QoS) or a QoS network communication parameter) a policy based decision can be taken or implemented. For example, the policy decision can be to maintain the QoS for a particular user device 108-124 or not, reduce the transmit power by one or more means, connect to a different link-partner or change the link technology, for example.

Figure 5:
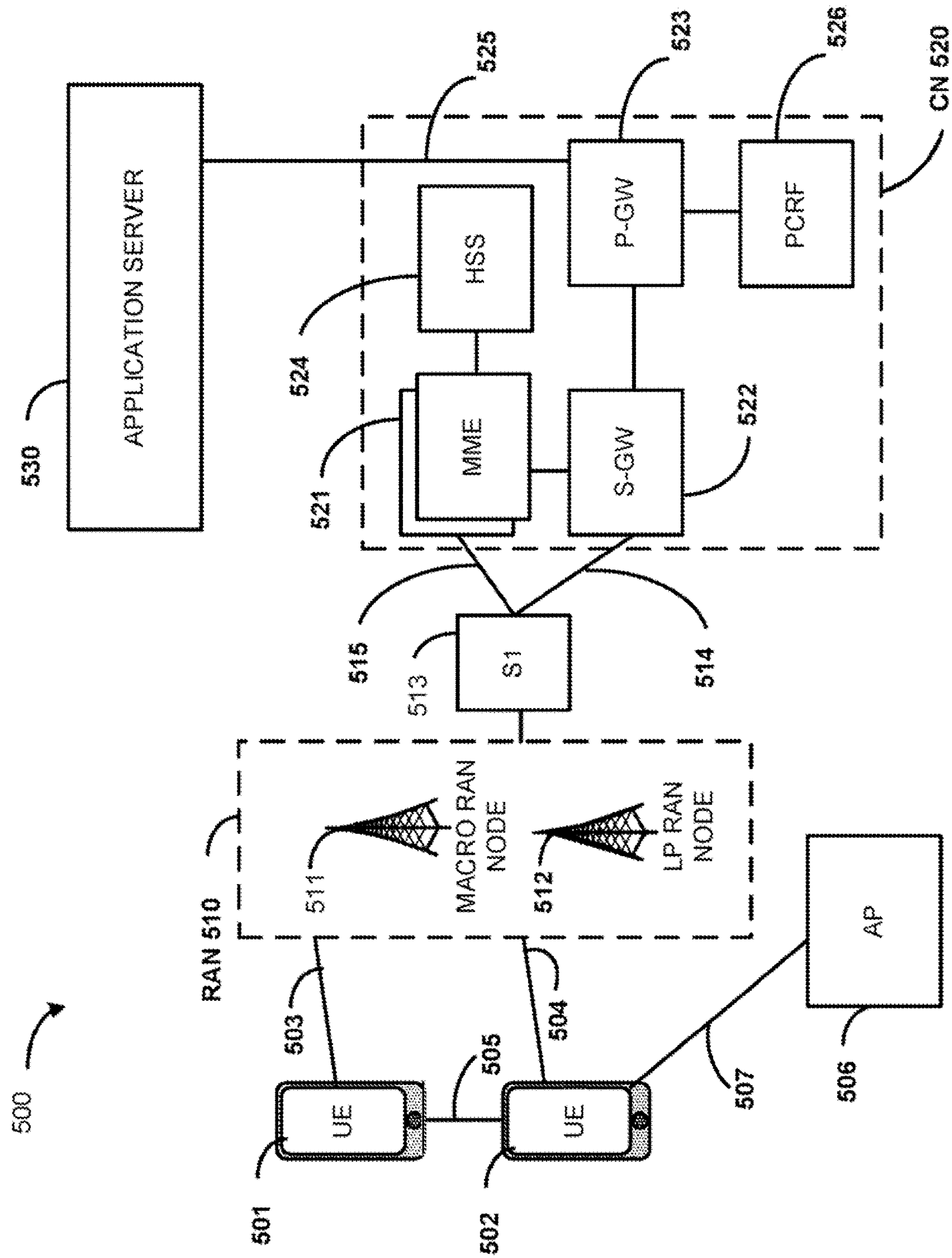
FIG. 5 illustrates a block diagram of example network devices communicatively coupled in a wireless network environment for according to various aspects or embodiments.

FIG. 5 illustrates an architecture of a system 500 of a network in accordance with some embodiments herein. The system 500 is shown to include a user equipment (UE) 501 and a UE 502, which can also be configured as any one of the user devices 102-106 of the network environments described herein. The UEs 501 and 502 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 501 and 502 can be configured to connect, e.g., communicatively couple, with a radio access network (RAN) 510—the RAN 510 can be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 can further directly exchange communication data via a Prose interface 505. The Prose interface 505 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes (e.g., APs of a cell network or APs of a home/office wireless network, such as APs 102-106) that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 can include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Prose or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (POSCH) can carry user data and higher-layer signaling to the UEs 501 and 502. The physical downlink control channel (POCCH) can carry information about the transport format and resource allocations related to the POSCH channel, among other things. It can also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 511 and 512 based on channel quality information fed back from any of the UEs 501 and 502. The downlink resource assignment information can be sent on the POCCH used for (e.g., assigned to) each of the UEs 501 and 502.

The POCCH can use control channel elements (CCEs) to convey the control information. Before being mapped to resource elements, the POCCH complex-valued symbols can first be organized into quadruplets, which can then be permuted using a sub-block interleaver for rate matching. Each POCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The POCCH can be transmitted using one or more CCEs, depending on the size of the downlink control information (OCI) and the channel condition. There can be four or more different POCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPOCCH) that uses POSCH resources for control information transmission. The EPOCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 510 is shown to be communicatively coupled to a core network (CN) 520—via an S1 interface 513. In embodiments, the CN 520 can be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PON) Gateway (P-GW) 523, and a home subscriber server (HSS) 524. The MMEs 521 can be similar in function to the control plane of legacy Serving General Packet Radio Service (GPRS) Support Nodes (SGSN). The MMEs 521 can manage mobility aspects in access such as gateway selection and tracking area list management. The HSS 524 can comprise a database for network users, including subscription-related information to support the network entities' handling of communication sessions. The CN 520 can comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 can terminate the S1 interface 513 towards the RAN 510, and routes data packets between the RAN 510 and the CN 520. In addition, the S-GW 522 can be a local mobility anchor point for inter-RAN node handovers and also can provide an anchor for inter-3GPP mobility. Other responsibilities can include lawful intercept, charging, and some policy enforcement.

The P-GW 523 can terminate an SGi interface toward a PON. The P-GW 523 can route data packets between the EPC network 523 and external networks such as a network including the application server 530 (alternatively referred to as application function (AF)) via an Internet Protocol (IP) interface 525. Generally, the application server 530 can be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 can further be a node for policy enforcement and charging data collection. Policy and Charging Enforcement Function (PCRF) 526 is the policy and charging control element of the CN 520. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 can be communicatively coupled to the application server 530 via the P-GW 523. The application server 530 can signal the PCRF 526 to indicate a new service flow and select the appropriate Quality of Service (QoS) and charging parameters. The PCRF 526 can provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
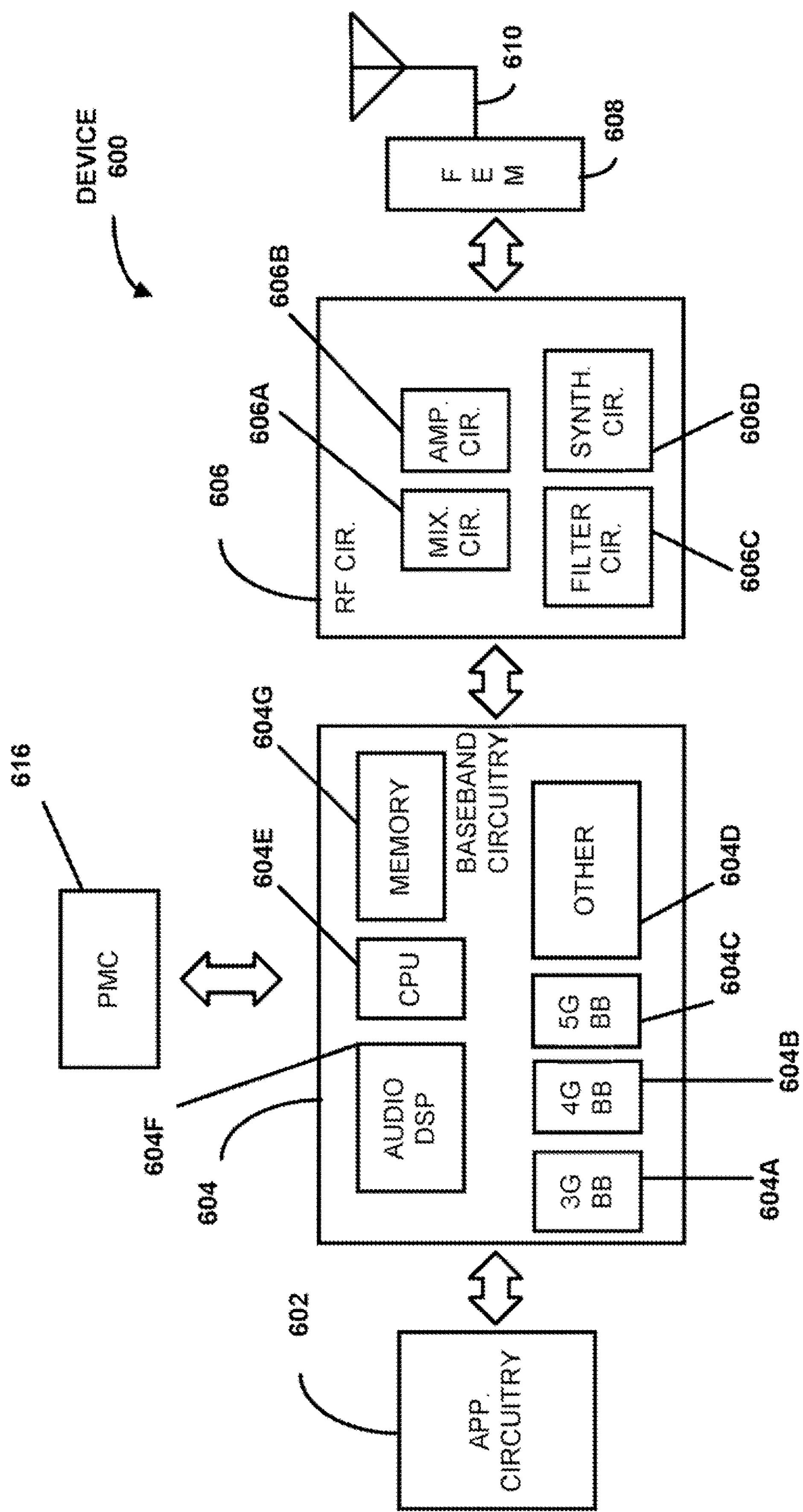
FIG. 6 illustrates another block diagram of an example network device according to various aspects or embodiments.

FIG. 6 illustrates example components of a network device 600 in accordance with some embodiments. The network device 600 can comprise or be any of the user devices 108-122 or modem/router/AP/other network devices 102-106. In some embodiments, the device 600 can include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 can be included in a UE 501, 506 or a RAN node 511, 516, AP, AN, eNB or other network component. In some embodiments, the device 600 can include less elements (e.g., a RAN node could not utilize application circuitry 602, and instead include a processor/controller to process IP data received from an EPC). In some embodiments, the network device 600 can include additional elements such as, for example, memory/storage 604G, display, camera, sensor, or input/output (I/O) interface. In other embodiments, the components described below can be included in more than one device (e.g., said circuitries can be separately included in more than one device for Cloud-RAN (C-RAN) implementations).

The application circuitry 602 can include one or more application processors. For example, the application circuitry 602 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 600. In some embodiments, processors of application circuitry 602 can process IP data packets received from an EPC.

The baseband circuitry 604 can include circuitry such as, but not limited to, one or more single-core or multi-core processors. The baseband circuitry 604 can include one or more baseband processors or control logic to process baseband signals received from a receive signal path of the RF circuitry 606 and to generate baseband signals for a transmit signal path of the RF circuitry 606. Baseband processing circuitry 604 can interface with the application circuitry 602 for generation and processing of the baseband signals and for controlling operations of the RF circuitry 606. For example, in some embodiments, the baseband circuitry 604 can include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (6G), si6h generation (6G), etc.). The baseband circuitry 604 (e.g., one or more of baseband processors 604A-D) can handle various radio control functions that enable communication with one or more radio networks via the RF circuitry 606. In other embodiments, some or all of the functionality of baseband processors 604A-D can be included in modules stored in the memory 604G and executed via a Central Processing Unit (CPU) 604E. The radio control functions can include, but are not limited to, signal modulation/demodulation, encoding/decoding, radio frequency shifting, etc. In some embodiments, modulation/demodulation circuitry of the baseband circuitry 604 can include Fast-Fourier Transform (FFT), precoding, or constellation mapping/demapping functionality. In some embodiments, encoding/decoding circuitry of the baseband circuitry 604 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 604 can include one or more audio digital signal processor(s) (DSP) 604F. The audio DSP(s) 604F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 604 and the application circuitry 602 can be implemented together such as, for example, on a system on a chip (SOC).

In some embodiments, the baseband circuitry 604 can provide for communication compatible with one or more radio technologies. For example, in some embodiments, the baseband circuitry 604 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol can be referred to as multi-mode baseband circuitry.

RF circuitry 606 can enable communication with wireless networks using modulated electromagnetic radiation through a non-solid/solid medium. In various embodiments, the RF circuitry 606 can include switches, filters, amplifiers, etc. to facilitate the communication with the wireless network. RF circuitry 606 can include a receive signal path which can include circuitry to down-convert RF signals received from the FEM circuitry 608 and provide baseband signals to the baseband circuitry 604. RF circuitry 606 can also include a transmit signal path which can include circuitry to up-convert baseband signals provided by the baseband circuitry 604 and provide RF output signals to the FEM circuitry 608 for transmission.

In some embodiments, the receive signal path of the RF circuitry 606 can include mixer circuitry 606*a*, amplifier circuitry 606*b* and filter circuitry 606*c*. In some embodiments, the transmit signal path of the RF circuitry 606 can include filter circuitry 606*c* and mixer circuitry 606*a*. RF circuitry 606 can also include synthesizer circuitry 606*d* for synthesizing a frequency for use by the mixer circuitry 606*a* of the receive signal path and the transmit signal path. In some embodiments, the mixer circuitry 606*a* of the receive signal path can be configured to down-convert RF signals received from the FEM circuitry 608 based on the synthesized frequency provided by synthesizer circuitry 606*d*. The amplifier circuitry 606*b* can be configured to amplify the down-converted signals and the filter circuitry 606*c* can be a low-pass filter (LPF) or band-pass filter (BPF) configured to remove unwanted signals from the down-converted signals to generate output baseband signals. Output baseband signals can be provided to the baseband circuitry 604 for further processing. In some embodiments, the output baseband signals can be zero-frequency baseband signals, although this is not a requirement. In some embodiments, mixer circuitry 606*a* of the receive signal path can comprise passive mixers, although the scope of the embodiments is not limited in this respect.

In some embodiments, the mixer circuitry 606*a* of the transmit signal path can be configured to up-convert input baseband signals based on the synthesized frequency provided by the synthesizer circuitry 606*d* to generate RF output signals for the FEM circuitry 608. The baseband signals can be provided by the baseband circuitry 604 and can be filtered by filter circuitry 606*c*.

In some embodiments, the mixer circuitry 606*a* of the receive signal path and the mixer circuitry 606*a* of the transmit signal path can include two or more mixers and can be arranged for quadrature downconversion and upconversion, respectively. In some embodiments, the mixer circuitry 606*a* of the receive signal path and the mixer circuitry 606*a* of the transmit signal path can include two or more mixers and can be arranged for image rejection (e.g., Hartley image rejection). In some embodiments, the mixer circuitry 606*a* of the receive signal path and the mixer circuitry 606*a* can be arranged for direct downconversion and direct upconversion, respectively. In some embodiments, the mixer circuitry 606*a* of the receive signal path and the mixer circuitry 606*a* of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 606 can include analog-to-digital converter (ADC) and digital-to-analog converter (DAC) circuitry and the baseband circuitry 604 can include a digital baseband interface to communicate with the RF circuitry 606.

In some dual-mode embodiments, a separate radio IC circuitry can be provided for processing signals for each spectrum, although the scope of the embodiments is not limited in this respect.

In some embodiments, the synthesizer circuitry 606*d* can be a fractional-N synthesizer or a fractional N/N+1 synthesizer, although the scope of the embodiments is not limited in this respect as other types of frequency synthesizers can be suitable. For example, synthesizer circuitry 606*d* can be a delta-sigma synthesizer, a frequency multiplier, or a synthesizer comprising a phase-locked loop with a frequency divider.

The synthesizer circuitry 606*d* can be configured to synthesize an output frequency for use by the mixer circuitry 606*a* of the RF circuitry 606 based on a frequency input and a divider control input. In some embodiments, the synthesizer circuitry 606*d* can be a fractional N/N+1 synthesizer.

In some embodiments, frequency input can be provided by a voltage controlled oscillator (VCO), although that is not a requirement. Divider control input can be provided by either the baseband circuitry 604 or the applications processor 602 depending on the desired output frequency. In some embodiments, a divider control input (e.g., N) can be determined from a look-up table based on a channel indicated by the applications processor 602.

Synthesizer circuitry 606*d* of the RF circuitry 606 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 606 can include an IQ/polar converter.

FEM circuitry 608 can include a receive signal path which can include circuitry configured to operate on RF signals received from one or more antennas 610, amplify the received signals and provide the amplified versions of the received signals to the RF circuitry 606 for further processing. FEM circuitry 608 can also include a transmit signal path which can include circuitry configured to amplify signals for transmission provided by the RF circuitry 606 for transmission by one or more of the one or more antennas 610. In various embodiments, the amplification through the transmit or receive signal paths can be done solely in the RF circuitry 606, solely in the FEM 608, or in both the RF circuitry 606 and the FEM 608.

In some embodiments, the FEM circuitry 608 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 can manage power provided to the baseband circuitry 604. In particular, the PMC 612 can control power-source selection, voltage scaling, battery charging, or DC-to-DC conversion. The PMC 612 can often be included when the device 600 is capable of being powered by a battery, for example, when the device is included in a UE. The PMC 612 can increase the power conversion efficiency while providing desirable implementation size and heat dissipation characteristics.

While FIG. 6 shows the PMC 612 coupled only with the baseband circuitry 604. However, in other embodiments, the PMC 6 16 can be additionally or alternatively coupled with, and perform similar power management operations for, other components such as, but not limited to, application circuitry 602, RF circuitry 606, or FEM 608.

In some embodiments, the PMC 612 can control, or otherwise be part of, various power saving mechanisms of the device 600. For example, if the device 600 is in an RRC_Connected state, where it is still connected to the RAN node as it expects to receive traffic shortly, then it can enter a state known as Discontinuous Reception Mode (DRX) after a period of inactivity. During this state, the device 600 can power down for brief intervals of time and thus save power.

In one embodiment, an amount of RF energy being transmitted can be controlled through the gain/amplification applied in the amplification circuit 606B; as such, the device could selectively reduce the RF energy by reducing the gain/amplification-factor in 606B. Multiple antennas 610 and related RF 606 and baseband 604 circuitry can be present in order to create RF directivity patterns (beamforming) through controlled phase-shifting of the individual RF signals relative to each other. Embodiments herein can further make use of this capability to focus energy to area where no biological entity or human detection is currently present at the time.

If there is no data traffic activity for an extended period of time, then the device 600 can transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 602 and processors of the baseband circuitry 604 can be used to execute elements of one or more instances of a protocol stack. For example, processors of the baseband circuitry 604, alone or in combination, can be used execute Layer 3, Layer 6, or Layer 1 functionality, while processors of the application circuitry 602 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 6 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 604G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

Figure 7:
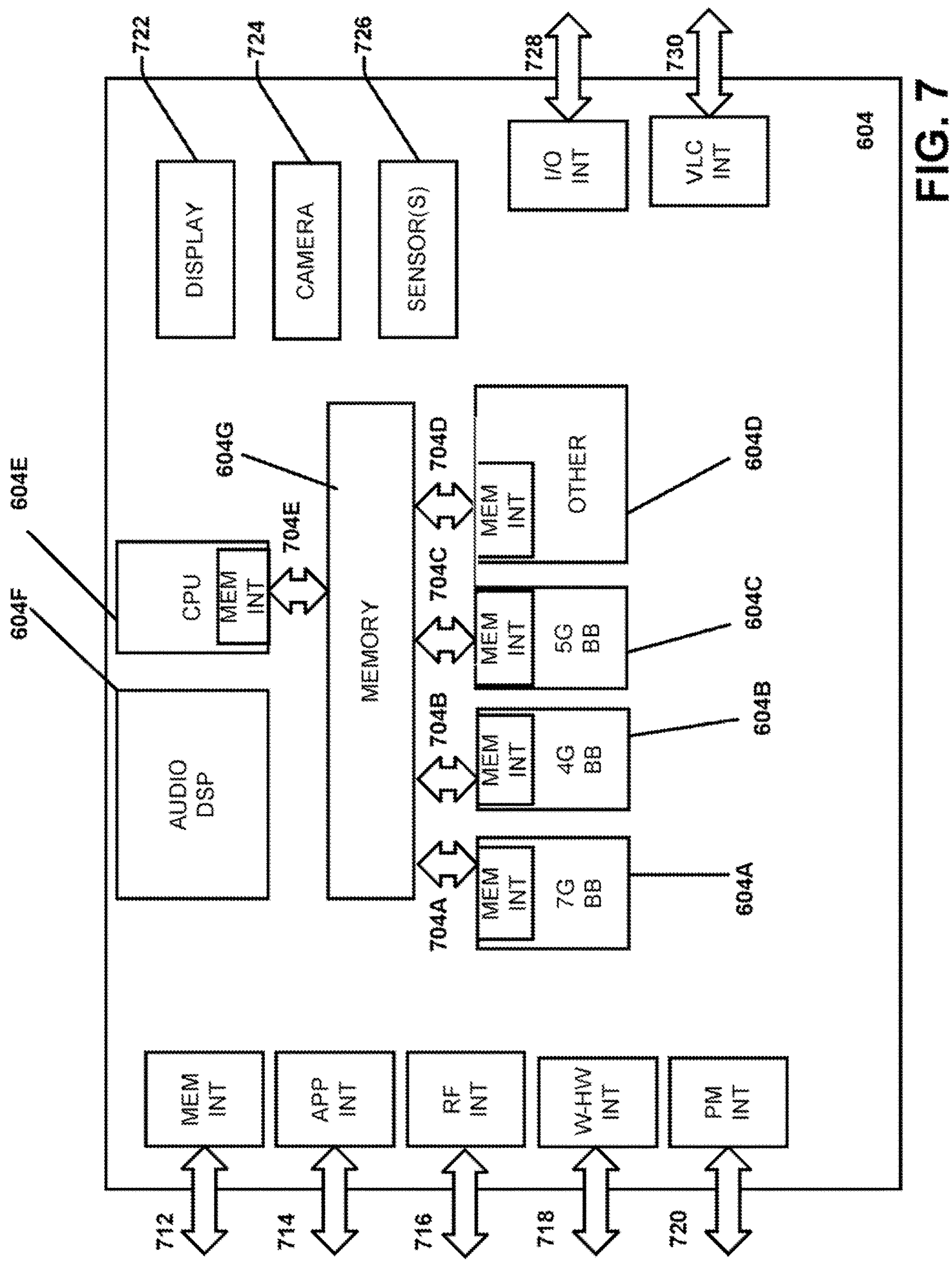
FIG. 7 another block diagram of an example of wireless communications network environment for network devices with various interfaces according to various aspects or embodiments.

FIG. 7 illustrates example interfaces of baseband circuitry in accordance with some embodiments. As discussed above, the baseband circuitry 604 of FIG. 6 can comprise processors 604A-604E and a memory 604G utilized by said processors. Each of the processors 604A-604E can include a memory interface, 704A-704E, respectively, to send/receive data to/from the memory 604G.

The baseband circuitry 604 can further include one or more interfaces to communicatively couple to other circuitries/devices, such as a memory interface 712 (e.g., an interface to send/receive data to/from memory eternal to the baseband circuitry 604), an application circuitry interface 714 (e.g., an interface to send/receive data to/from the application circuitry 602 of FIG. 2), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612).

In some embodiments, the baseband circuitry 604 of the network device 600 can include additional elements such as, for example, memory/storage 604G, display 722, camera 724, sensor 726, or input/output (I/O) interface 728 (e.g., a wired connection, Ethernet cable, a twisted wired, optical connection, or as well as any kind of input/output device, such as a monitor, keyboard, mouse, display or other input/output device), a VLC interface 730, or other interfaces configured to associated communication as discussed herein.

In an aspect, the sensor(s) 726 can include an optical sensor configured to detect an optic differential within an environment, home, office or other network setting or premise. Alternatively or additionally, the sensor(s) 726 can comprise an audio sensor configured to detect an audio property or an audio command, or a motion sensor configured to detect a movement associated with the biological presence. As such, the predetermined criteria for determining whether a biological presence is within a vicinity or proximity of the modem or network device can comprise at least one of: an optic differential, a motion differential, an audio property, a received power signal (e.g., a signal to noise ratio, an RSSI or the like), a received communication message, an awake message, a temperature differential, an activity (e.g., a user activity from a user device, a keyboard, mouse, display, awake message, other communication message indicating a presence, etc.), or a distance of the biological presence associated with the optic differential, the motion differential, the audio property, or the temperature differential, for example.

The intensity of an evenly distributed RF field decays with the square of the distance, and thus, the device 600 or baseband circuitry 604 can operate to determine a close proximity or distance of a human to a radiating source (e.g., the modem(s) or AP(s) 102-106). For example, a close proximity can be about ~1/10th of the largest dimension of a room 132-136 or the radiating modem(s) that a human or biological presence could be located in. It is assumed, that multiple sources of radiation are distributed in the room (and its neighboring rooms) 132, 134, 136, such that an accuracy of about 1 meter matters, as soon as strategies to reduce the RF energy are to be deployed.

In order to determine the presence of a human within ~1 m distance, most clients or user devices can comprise some sort of sensor(s) 726 that can allow to conclusions to be derived on the presence of a human or other biological presence. The below table I demonstrates some common examples of components or circuitry configurations for detecting such biological presence or human within a vicinity of the device 600, for example.

TABLE I

| Example Device | Device capabilities to detect presence of a human |
|---|---|
| Smartphone, Tablet | Gyro-sensor, camera, user-activity |
| Laptop Computer | Camera, user-activity |
| Digital Assistent (Amazon Echo) | Microphone array |
| Smart TVs | Microphone array |
| Intelligent Light | Passive infrared sensor (PIR) sensor/movement |

The devices 600 can use the sensor(s) 726 for different purposes than detection of humans. As such, one or more of the components of the baseband circuitry can perform as a decision taking logic. Further, other sensors can be added as a receive strength indicator read-out to the remote control receiver of a Smart TV, and an approximate distance of the user operating the remote control can be derived therefrom. Adding a low resolution CCD camera as the camera 724, for example, to any stationary type of equipment can include checking for movement in front of the equipment or user device. Further, the sensors 726 can also include a passive infrared sensor(s) (PIR) as used for alarm systems are very low cost and can even be used to detect a person in front of a device 600. Existing sensors may need different calibration or operating modes, in order to recognize a human being "very close" (1 m) versus "far-away". This can be accomplished by different thresholds (microphones, PIR) or through 3D/stereoscopic cameras as the camera 724, for example. Note that is acceptable to have wrong decisions for such type of detection, as the objective is to reduce the average RF exposure for the human users. Even though the disclosure assumes a binary decision "human present" versus "not present", an optional extension can be based on the measurement of a distance, as further described supra.

In another embodiment, the RF interface 716 can be configured to receive or transmit data over a radio interface between a wireless modem 102-106, for example, and a user device 108-124, in which either the modem or user device can be the network device 600. In response to the detection of a biological or human presence from the predetermined criteria, including an RF threshold or total RF energy threshold, the baseband circuitry 604 or other circuitry of the device 600 can respond by activating the optical/VLC interface configured to transmit data over an optical interface from the first wireless modem to the user device. VLC via (by) the VLC interface 730 can comprise a data communications variant that can use visible light in a spectrum range (e.g., between 400 and 800 THz (780-375 nm)). VLC can be a subset of optical wireless communications technologies, for example. The VLC interface 730 or components can utilize fluorescent lamps (ordinary lamps in lieu of special communications devices) to transmit signals at about 10 kbit/s, or light emitting diodes (LEDs) for up to about 500 Mbit/s, for example. Low rate data transmissions at 1 and 2 kilometers (0.6 and 1.2 mi) can be utilized, for example, or full Ethernet speed (e.g., about 10 Mbit/s) over the same distance thanks to larger optics and more powerful LEDs as incorporated with or communicatively coupled to the VLC interface 730, for example. In some aspects/embodiments, the VLC interface 730 can include components or electronic circuitry comprising a photodiode that receives signals from light sources, although in some cases utilizing a camera (e.g., camera 724 or other digital camera) can be sufficiently utilized.

The VLC interface 730 can include an image sensor used in these devices, which can further comprise an array of photodiodes (pixels) and in some applications its use can be operated over a single photodiode, or not. Such a sensor 726 can provide either multi-channel communication (down to 1 pixel=1 channel) or a spatial awareness of multiple light sources. Using visible light can be also less dangerous for high-power applications because humans can perceive it and act to protect their eyes from damage, as well as allow the decrease of RF energy or RF fields.

Figure 8:
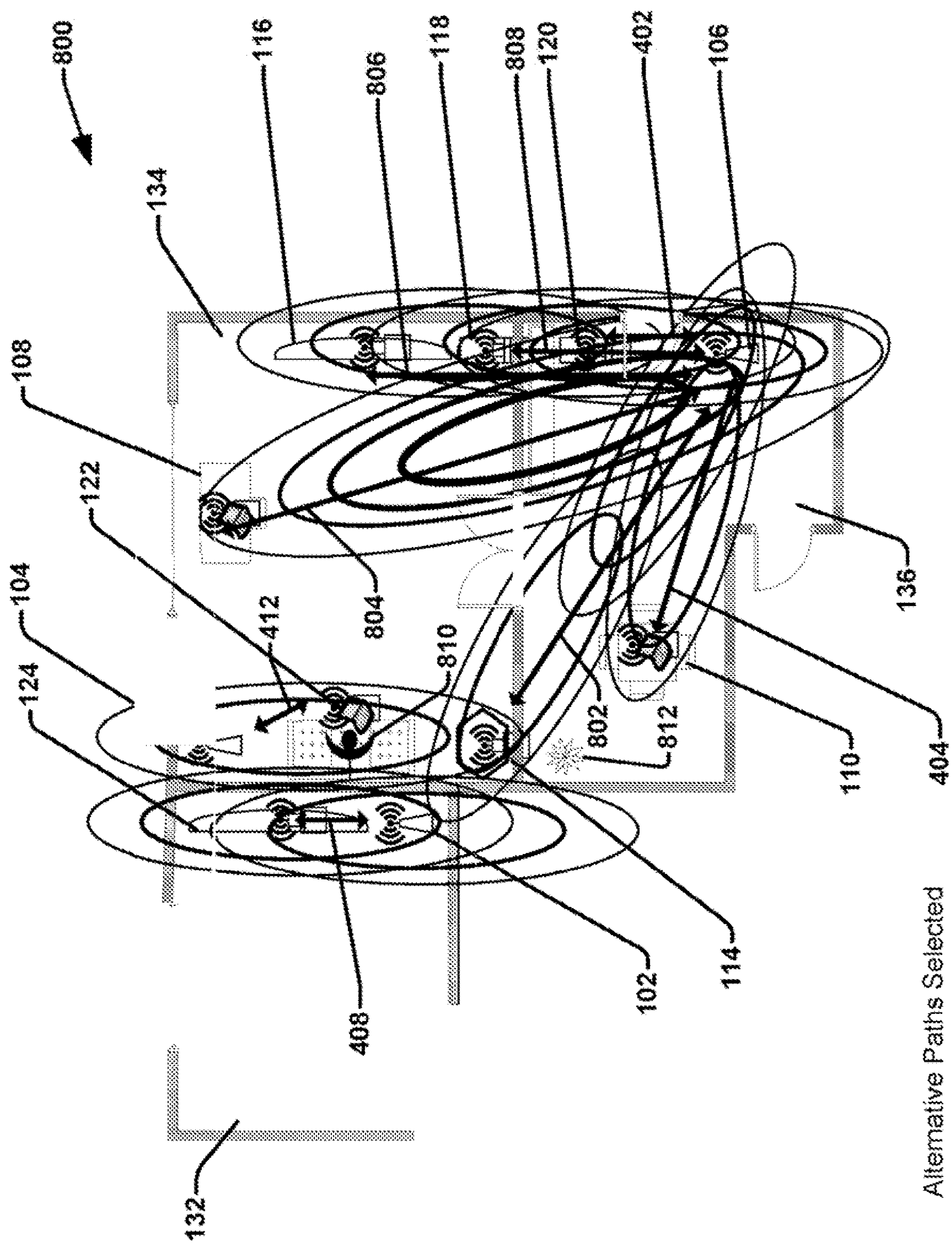
FIG. 8 illustrates another block diagram of an example wireless network environment with network devices according to various aspects or embodiments.

Referring to FIG. 8, illustrated is another embodiment of a network environment 800 with various network devices 102-106 (APs, modems, routers, or the like) configured to reduce the total RF energy and field distribution in response to detection of a biological or human presence.

The network environment 800 is similar to network environment 400 with the same space/rooms 132-136 and network devices (e.g., user devices 108-124 and modems/APs 102-106). However, the connections have been altered in response to a detection of a biological presence 810 or human entity based on various criteria (e.g., motion, audio, optic, temperature, user activity, total RF energy, distance, size of an associated change in any associated property parameter, related other parameters, or the like). In contrast to FIG. 4 and the network environment 400, the network environment has had one or more of the access points (e.g., device 104 and 106) cancel, handover or offload network connections 410 and 416-420 in response to the biological presence 810.

In an aspect, while some benefit can already be achieved with the detection of a biological or human presence 810 as outlined, other embodiments can incorporate operations based on the knowledge of quality-of-service (QoS) parameters. Typically, an electronic device is not necessarily designed (programmed) to intelligently schedule the phases of data-transmission. In the best case, a time based scheduling could be implemented such that communications or certain QoS parameters (e.g., bit rate, throughput, transmission delay, ACK NACK frequency, availability, jitter, or other related networking parameters) can be modified, reduced or enhanced at various times differently such as at peak activity or periods of low activity. An example can be seen with operating system updates, which can be scheduled to expected phases of PC inactivity.

In an aspect, a network device 102-106, for example, can operate to monitor a protocol or application layer information. For example, application layer information or associated relevant data can be derived at any protocol layer between a transport layer 4 and the application layer 7 of the open systems interconnection (OSI) model, in which at layer 4 or higher, a high priority traffic can be distinguished and treated differently. The network device 102-106 can classify wireless activity (application request, I/O activity, user communications, other activity of layers of the OSI model, or the like) according to non-deferrable activity, long-term deferrable activity, or short-term deferrable activity based on the protocol or the application layer information ascertained. Based on the classification of the activity from one or more user devices 108-124, for example, a set of modem parameters can be modified to lower or reduce the risk of RF energy exposure.

Modem parameters can be altered to reduce RF energy or RF distribution fields herein and comprise at least one of: a total amount of data to be transferred, an upper time bound for execution, a minimum transmission rate, related to the wireless activity. The modem parameters, for example, can also include a transmission property of a physical layer, a frequency band, an amount of airtime, a directivity pattern, a physical connection, a medium of communication (e.g., air, light, wire) or a standard of communication (e.g., Zigbee, Ethernet, WiFi 802.11 or the like). A control component (e.g., one or more components of baseband circuitry 604 of FIG. 6) can be configured to modify one or more modem parameters of a network device 102, 104, 106 from a nominal transmission operation in response to the detection component detecting the biological presence within a proximity or distance therefrom to a different value that causes a lower RF energy or RF field exposure within a room or premise upon detection of the biological presence as well as classification wireless network activity.

Non-deferrable activity can be activity that cannot be deferred to a later point in time. Long-term deferrable activity can be activity that can wait several hours or even days for a situation where no human user or biological presence is close or detected and RF energy or distribution fields are not above a threshold, for example. Short-term deferrable activity can be activity that cannot be delayed for hours like the long-term deferrable activity, but does not need instantaneous execution. The classification can be implemented as part of the applications or the application circuitry, which source/sink the data, or it can be centralized and be based on packet inspection or lookup tables stored in a memory (e.g., memory 604G) or executed by CPU 604E.

In another aspect, a classification of the long-term deferrable activity and the short-term deferrable activity can be performed with or based on additional information/criteria such as the following: i. a total amount of data to be transferred; ii. an upper time bound for execution; or iii. requirements towards a minimum transmission rate. These additional parameters can further be utilized by the network device 102-106, for example, to decide how the network can service the request. The classification into these three categories (non-deferrable, long-term deferrable, or short-term deferrable activity) can include additional or less categories, comprising any number of categories larger than one to be used.

Types of data or activity can be dynamically classified on the fly or pre-determined based on a list or look-up table. For example, Table II below can be an example of activities and resulting classifications either dynamically or based on a data set, list or look-up table.

| Example Application | Resulting Classification |
|---|---|
| VoIP Call | A. non-deferrable |
| Software/Firmware Updates | B. long-term deferrable |
| HTTP(S) traffic from Smartphone, Tablet, PC | A. non-deferrable |
| Music/Media Streaming | C. short-term deferrable |
| Home Automation | C. short-term deferrable |
| File Backup to NAS, Upload to cloud storage | C. short-term deferrable |
| Email Clients | C. short-term deferrable |

In contrast to FIG. 4 and the network environment 400, the network environment has had one or more of the access points (e.g., device 104 and 106) cancel, handover or offload network connections 410 and 416-420 in response to the biological presence 810. The connections or link technology of each connection 402-420 could be altered based on classification, biological presence detection and predetermined criteria, and result from an alteration of one or more modem (or network device) parameters.

For example, connections can increase or decrease from an AP device 102-106 such as with network device 104 or 106. At FIG. 8, the network device 104 now has a less number/amount of link network connections (e.g., 410, 416-420 are terminated) due to the detection of the biological presence 810 and modification of one or more modem parameters in the network. Additionally, network device 106 can have a greater number of network connections 802-808, for example, in response to offloading, handover operations from the network device 104, as well as not detecting a human or biological presence 810 within the room 136 or a defined distance from the device 106. As such, a network device 102-106 can alter or change a physical connection by changing the link technology being utilized for network communications.

The term link technology can refer to the transmission properties of the physical layer link technology or to the type of physical connection being used by the client for the purpose of data exchange as a network communication. As a consequence of a human or biological presence being detected, at least one parameter of the physical layer can be changed. For example, this parameter can be the transmit power of the RF transmitters (e.g., RF interface 716 or other interface component) or another modem parameter. By temporarily reducing the transmit power, the strength of the RF field can be reduced as well. Other key parameters may be adjusted in addition, like changing the frequency band, reducing airtime, changing directivity patterns, beamforming, or the like.

In another aspect, depending on the wireless modem technology of choice, the network device 102, 104 106 could suspend or return to the nominal RF transmit power for short periods of time after modifying parameters to lower this energy despite detection of the biological presence. For example, a network device 102-106 could be configured (via one or more of the baseband processors, CPU, executable instructions of a memory or the like) to select a policy based on a detection of the biological presence. The policy can selected from among a set of policies comprising a first action to suspend an amount of transmitted radio frequency (RF) energy of the first wireless modem, a second action to connect a user device to a second wireless modem, and third action comprising altering a wireless local area network connection to a powerline communication connection, a wired Ethernet connection, a visible light communication (VLC) connection, another alternative communication path, defer the particular activity based on an associated classification, or other policy action including modifying any modem parameter to reduce or temporarily suspend total RF energy in the room or generated by the particular network device 102-106, for example. Another policy can include a control component or processing component (e.g., CPU or baseband processor) suspending another transmission operation with a lower RF energy to the nominal transmission operation based on a priority of a task or a user device over another task or another user device, for example. This priority can be based on the classification and a weighting of a particular activity in a look-up table or data set.

In another aspect, there can be multiple options to exchange data between various communication protocols or standards. For example, in addition to IEEE 802.11 WLAN as link technology, there can be powerline communication, wired Ethernet, a visible light communication (VLC), millimeter (mm) wave guide, or the like. Further, these multiple options can include exchanging data between different networks, such as 3G, 4G, 5G WAN access networks or beyond. All examples except WLAN expose the user to a minor or no RF fields. Depending on the use-case or user device, these alternate physical link technologies may or may not be viable (e.g. powerline is not an option for a Smartphone), or they may provide less performance or convenience. If an alternative communication path (that produces a lower or no RF field) exists, and this communication path can still cope with the same or similar QoS requirements, this alternative communication path (e.g., 802-808) could be chosen for transmission and the user device 108-124 could be handed over or offloaded for another network device to pick up and service, either with the same QoS or different based on any activity that may or may not be driving the network transition.

The network or modem device 102-106 can also be configured to analyze the current service requirements and to decide on a different physical link-technology (if built into the equipment under question), once a human is close within the vicinity and the biological presence is detected, which can occur from a large enough criteria change or predetermined criteria is sensed according to or satisfaction of a predetermined threshold. Each physical link technology could provide specific quality of service/modem parameters like link-rate or latency. As data has been classified according to one of the classifications described herein, the alternate physical link technology can be selected to transmit those types of data, whose QoS requirements are fulfilled by the alternate physical link technology.

In one example scenario, a network device 110 (e.g., a multifunctional peripheral (MFP)) (e.g., a printer, scanner, or other external device communicatively coupled to the network or user device) can be attached through a WLAN connection (e.g., 404) to a small enterprise network, which can be enabled via a modem or router 106, for example. The WLAN 404, for example, can offer a 400 Mbit/s connectivity. The MFP 110 can be situated in a small room 136, which people can enter to fetch print-outs or to perform scans. The room 136 can be equipped with a light-source 812 that can turn automatically on, if someone 810 enters the room, as a part of the network device 110 or communicatively connected to the network device 110. This light-source 812 can be connected to the company network and offers VLC communication capabilities at about 50 Mbit/s, for example. The multifunctional peripheral 110, for example, can be equipped with a (bi-directional) VLC modem (e.g., VLC interface 730) and change from WLAN to VLC communications as soon as someone comes close and the light is activated. WLAN can then be temporarily turned off In some aspects, WLAN or the RF interface 716, for example, can operate to receive data, while the VLC interface operates to transmit data.

In another example, a file upload from a laptop computer 122, for example, to a cloud storage can be classified as a short-term deferrable activity with 5 Mbyte of data to be executed within the next 1 hour. This can be accomplished with ~12 Kbit/s free bandwidth. The laptop 122 can be connected through WLAN 412 to a distant access-point 104, but also through a Bluetooth Class 3 modem (1 mW RF power) to a nearby desktop PC 108 or 114, which can comprise an Ethernet LAN connection. For the purpose of the file transfer, the path via Bluetooth to the desktop PC 108 or 114 and from there via Ethernet could enable a significantly lower RF field for the user in front of the laptop.

In other aspects, the network device 102-106 could change the link partner or from one network device 102 to another 104 for wireless modems utilizing the same or similar link technology. Here, the objective is not to reduce the RF field energy, but to concentrate the RF field energy to areas where no human is present or biological presence is detected by either network device. In particular, the involved modems (first device 102, second device 106 or other network device) could have a 3D map-like awareness of the rooms 132, 136 they are operated in, plus the precise localization of humans, either by a GPS communication from the user devices or a tracking component or information that can be garnered from sensors 726 and related criteria/measured data. For example, a sufficient analysis could make use of a motion detection technique based on WLAN RSSI analysis to determine any presence. Motion detection based on receive strength signal indication (RSSI) can be utilized in order to detect the presence of a human inside the RF field between two wireless communication partners, for example.

In an embodiment, IEEE 802.11ac can enable a multiuser-multi-input, multi-output (MU-MiMo) operation. The multiuser MIMO operation can create directivity patterns of the RF fields such that the energy is directed towards the communication partner or second network device 106, for example. In particular for wireless modems with directed fields, the (spectral) analysis of the RSSI signals can be used to select a preferred connection. The preferred connection can be the one that does not see or detect the RSSI variation.

An example scenario can be illustrated from two access points AP1 104, AP2 106, and two clients C1 116, C2 118 are assumed with connections 416 and 418, respectively. The normal operating condition without human or biological presence can be described as: AP1 104↔C1 116; AP2 106↔C2 118, but in response to a human interfering or detected as a biological presence moving inside the RF field between AP1 104 and C1 116, while the field between AP2 106 and C2 118 remains without disturbance. The RSSI analysis could reveal the "interference". As such, C1 116 can probe AP2 106 and despite of lower data-rate, establish a connection to AP2 106 instead of AP1 104. Alternatively, AP 1 or AP 2 could handover or offload the connection to one another. The resulting scenario being AP2↔C1; AP2↔C2. This AP1 104 is temporarily without client and the (directed) RF field in which the human is moving has been removed, whether the biological presence is associated with any user device 122 or not.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or pre apart from those illustrated and/or described herein. In addition, not all illustrated acts may be required to implement one or more aspects or embodiments of the description herein. Further, one or more of the acts depicted herein may be carried out in one or more separate acts and/or phases.

Figure 9:
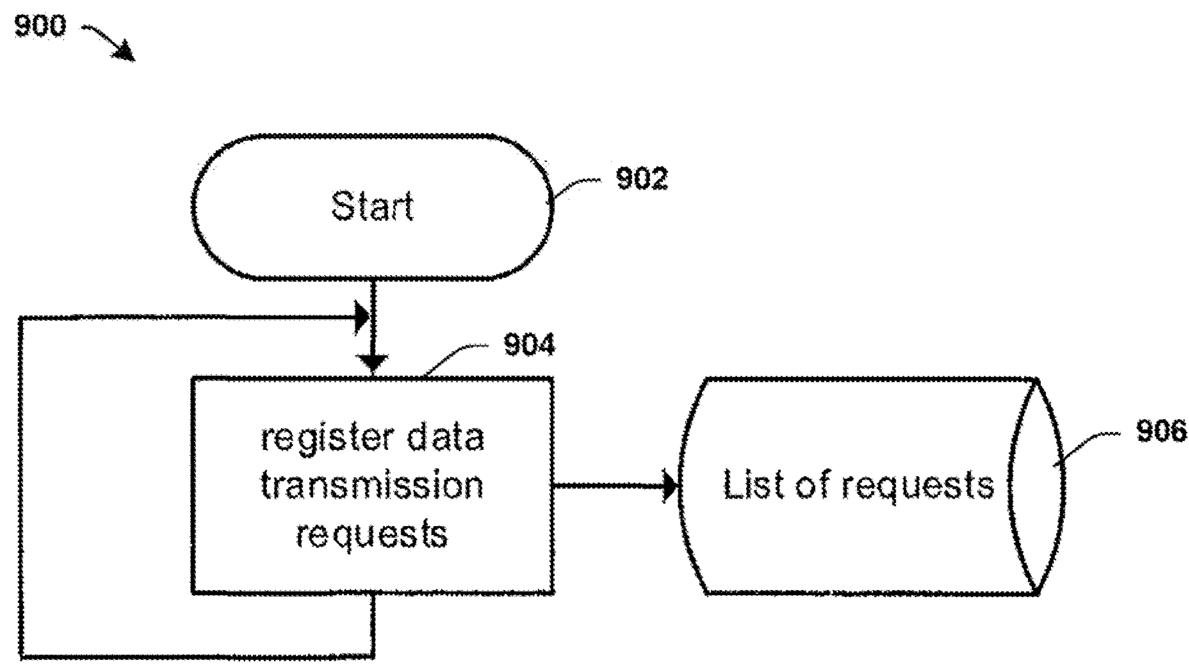
FIG. 9 illustrates a process flow for a periodic registration of requests for data transmission according to various aspects or embodiments described herein.

Referring to FIG. 9, illustrated is an example process flow 900 for an independent process for subsequent policy decisions or modification of modem parameters as a constant analysis of data transmission, and the resulting classification. The process flow 900 can initiate at 902. If a need for data transmission is recognized at 904, this request can be classified and stored/registered in a data-base 906, denoted as "list" in the flow charts or process flows.

Figure 10:
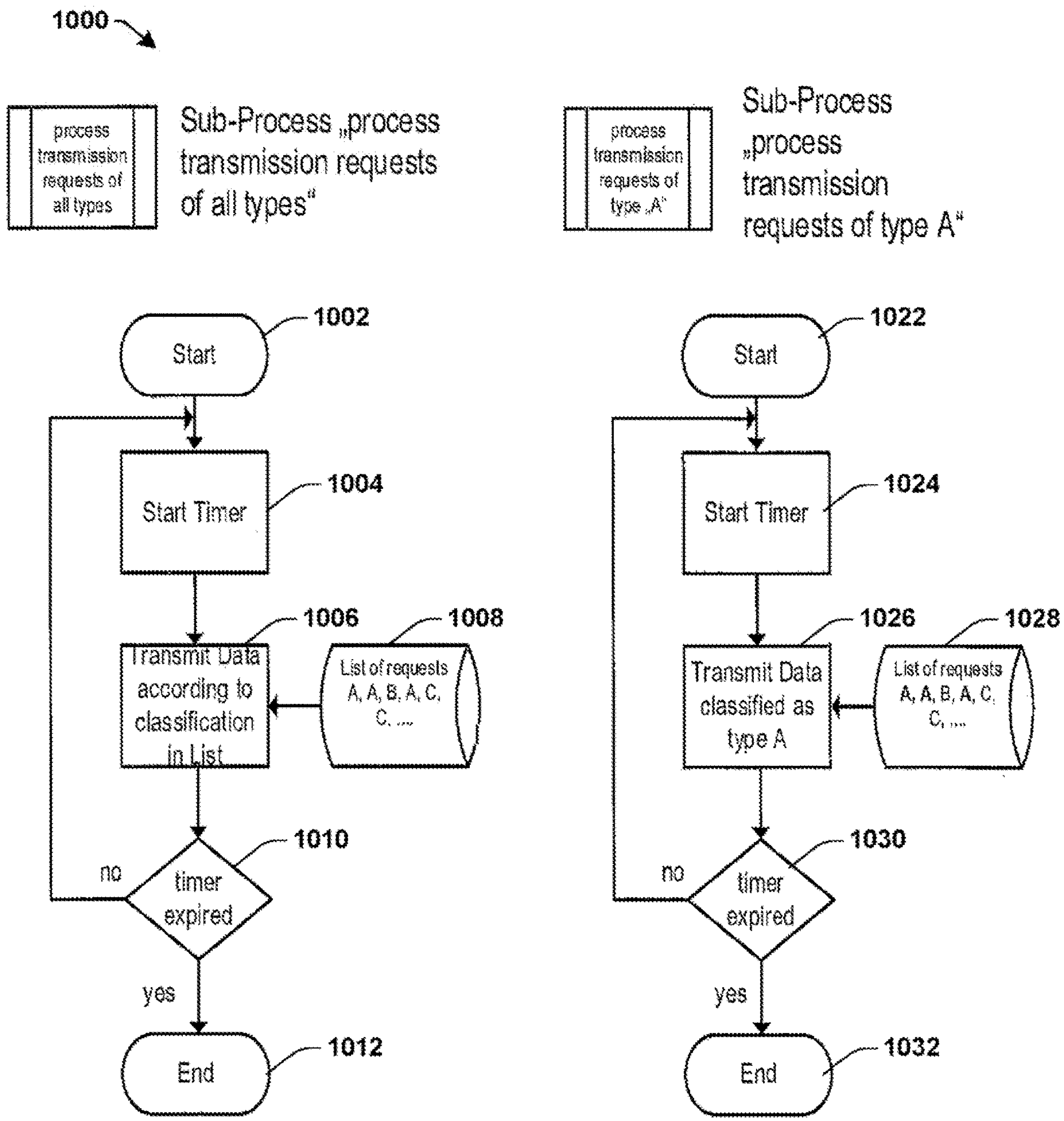
FIG. 10 illustrates another process flow for data transmission according to various aspects or embodiments described herein.

Referring to FIG. 10, illustrated is another example process flow 1000 for processing data transmissions based on a detection of a biological presence with the classification of data/user device activity, or data resulting from user device activity. The process 1000 further maps the exchange of data so that the processes can be a sub-process transmission requests of all types or any type of data activity with acts 1002-1012, or requests for non-deferrable activity (Type A) with acts 1022-1032. The processes can initiate independently at the same or different network devices or concurrently.

At 1002, 1022 the process flows initiate, and at 1004, 1024 a start time can begin. The start time can initiate with the detection of a biological presence, a data exchange, or a communication of data by a user device, for example.

At 1004, 1024 a data transmitted or transmit data can be classified either in a list, which can be based on a first in first out, a predefined priority, or other order of operation by which the data is ordered to be processed based on the data set or memory of categories or classifications of the data in the storage 1008, 1028. The list 1008, 1028 can comprise a classification and an optional, related "time-out" value. The time-out value can be used to specify a latest point in time, until the data has to be exchanged or communicated. For example, a software update may have a long time-out of even days as a long-term deferrable activity, while a file backup could occur within a few hours as a short-term deferrable activity.

At 1010, 1030, a decision of whether the time out value has expired or not can be made. If yes, then the process flows expire at 1012, 1032, but if not, the processes 1000 can start over.

The process flows 1000 can operate with a periodic registration of requests for data transmission. The actual exchange of data can be mapped to flowcharts. In a prior-art implementation, all data in the queue is exchanged, regardless of urgency. Prioritization schemes are widely used, but bulk or all traffic is not necessarily classified.

Figure 11:
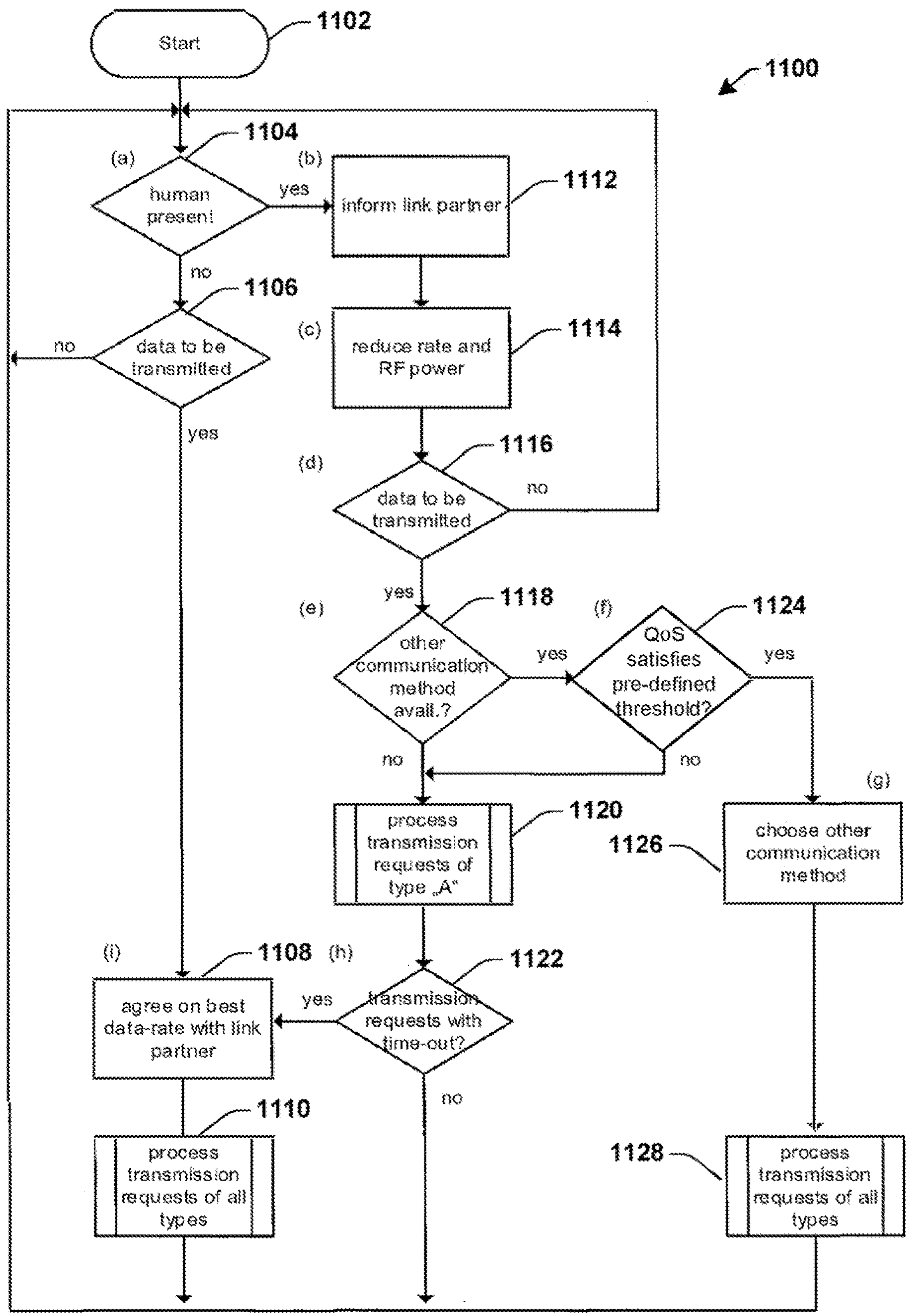
FIG. 11 illustrates another process flow for core decisions by a network device according to various aspects or embodiments described herein.

FIG. 11 illustrates a process flow 1100 including core decisions taken by a network device (e.g., 102-106) with the capability or configuration that enables detection of a human or biological presence within a distance or room.

The process flow 1100 initiates at 1102, and at 1104 a decision is made as to whether a human or a biological presence is detected within a proximity, vicinity of a network device or a defined distance (e.g., the network boundary or a sub-distance within the boundary). A human presence can be detected with further thresholds as a function of predetermined criteria. For example, if a motion, optical change or light differential, RSS change, temperature, a user activity, a user device communication, a message (e.g., an awake message) or the like is detected, and within a distance or certain differential or size, then a human presence could be detected (triggered, derived, deduced, or the like) over a biological presence.

The individual decisions to be taken are listed (classified and stored/registered in a data-base). Almost the same process flow 1100 can be applied to a network device (e.g., 102-106) that is lacking the capability to detect the local presence of humans, provided it is connected to one or more other network devices with this detection capability. In this case, decision (a) is replaced by the reception of the corresponding information (sent by link partner in step (b)).

In order to keep the illustration simple, the additional decision according to chapter 4 (link partner) is not shown. It can for example take place between step (e) 1118 and (h) 1122 as an additional/alternative communication path, standard, medium (light with VLC, wired or the like) or otherwise as discussed herein. This decision would check "if RSSI indicates human inside RF field" and branch to a second condition, checking for the possibility to connect to another link partner.

If the decision at 1104 is no, then the process flows to 1106 where a decision to determine whether data is to be transmitted or queued for transmission or not. If the decision 1106 is no, then the process flows back to 1104; if the decision is yes, then the process flows to 1108 to determine what the optimal data-rate is with the link partner or alternative communication path is.

At 1110, the transmission is processed based on the predetermined criteria regardless of the classification.

Alternatively, if the decision at 1104 is yes, then the process flow continues at 1112 with aspects or processes associated with modifying a link partner or alternative communication. After a link partner such as another network device is informed, either for handover, offloading or communication path change, a reducing in the rate or RF power can be enabled at 1114.

The process flow 1100 then continues at a decision 1116 as to whether data needs to be transmitted or not. If not, the process feeds back to decision 1104, but if yes, then a decision is made as to whether other communication methods or paths are available at 1118.

If other paths are available, in an embodiment, the QoS parameters can be checked as to whether the other channel, connection, communication path, standard or medium can accommodate a pre-defined threshold for a QoS. For example, the QoS can be comparable (about the same) or above a pre-defined threshold in relation to a current or previous channel, connection, communication path, standard or medium. If the QoS parameters are similarly available with another connection or network device, then at 1126 the network device can choose the other communication path or method, and at 1128 process transmission request from all types instead of just based on a classification (e.g., of Type A or non-deferrable) and on down in priority with short-term deferrable activities and then long-term deferrable ones.

If the QoS parameters are not similarly available with another connection or network device, then a request or activity is processed based on the classification of the data or activity at 1120. A decision can be made at 1122 to determine or set a time-out. If no time-out is made, then the process flow 1100 initiates over or repeats. If the decision is yes, then an agreement or agree process can be made to a best data rate with a link partner. Then at 1110 the transmission requests can be processed with all types of data thereafter.

The processes, aspects or embodiments can be realized by using existing hardware architectures and by implementing software components which implement the activities outlined in the flowcharts. These software components are preferably de-centralized, e.g. each radiating device is equipped with an appropriate software module/component. However, also a subset of devices equipped with the particular software will reduce exposure to RF energy.

Instead of concentrating the flowchart implementation in a single software module, the tasks can be split and integrated with many of the software components of a device. For instance, the task of registering requests and scheduling transmission can be split to all involved client applications.

The processes or acts corresponding to embodiments/aspects herein can be integrated as a service with an operating system, or its functionality can be encapsulated in a stand-alone application.

As such, a wireless network system can comprise at least two wireless modems, one or more capable to recognize physical presence of humans and to adjust modem parameters as a result of detection. Modem parameters can be adjusted by adjusting a transmitted RF energy, for example, or selecting another wireless modem as a link partner, or alternative communication path/medium/or standard.

The wireless network system can also be able to classify transmission requests according to a set of pre-defined QoS parameters. Further, it can operate to process only a subset of transmission request while a human is present, rather than a complete set of all transmission requests (user device activity).

Figure 12:
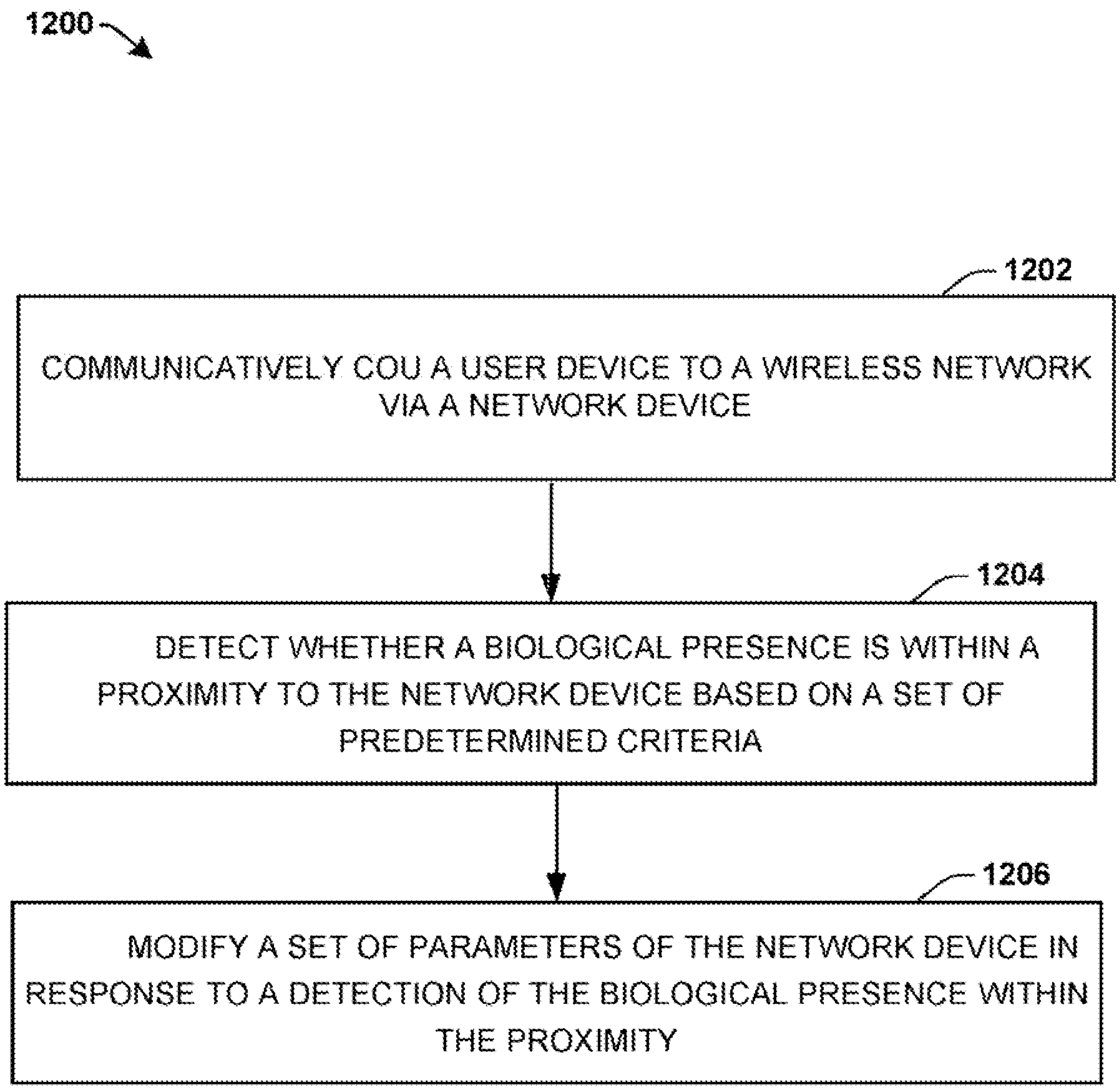
FIG. 12 illustrates another process flow by a network device according to various aspects or embodiments described herein.

Referring to FIG. 12, illustrated is another process flow 1200 for network devices in accordance with aspects/embodiments herein. At 1202 the method initiates with communicatively coupling a user device (e.g., network devices 108-124 or the like) to a wireless network via/by a network device (e.g., a modem, router, access point or other network device).

At 1204, the process 1200 includes detecting whether a biological presence is within a proximity to the network device based on a set of predetermined criteria.

At 1206, the process 1200 further includes modifying a set of parameters (e.g., modem/network parameters or other criteria) of the network device in response to a detection of the biological presence within the proximity. The modification of the parameters can include reducing an amount of transmitted RF energy from the network device.

Reducing the amount of RF energy of the network device can include enabling an alternative communication path with less RF energy between the user device and the network device or offloading/handing over the user device to another access point or modem for example. An alternative communication path can comprise a visible light communication (VLC) configured to transmit data in lieu of or with a radio frequency interface.

In other embodiments, the network device can operate to classify a wireless activity based on non-deferrable activity, long-term deferrable activity, and short-term deferrable activity, and a modification of the parameters can be based on the classification of the wireless activity or transmission requests.

Additionally or alternatively, reducing the amount of RF energy of the network device can include modifying at least one of: a fragmentation size of data packets, a transmission power, a re-try count for retransmissions, or a directivity pattern, as part of the set of parameters, for example.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage, "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus employed in a modem device, comprising: one or more processors configured to: determine whether a biological presence is within a proximity based on a set of predetermined criteria; modify a set of modem parameters in response to the biological presence being detected; reduce an amount of transmitted radio frequency (RF) energy below a predetermined threshold in response to a modification of the set of modem parameters; and a radio frequency interface configured to receive or transmit data over a radio interface.

Example 2 includes the subject matter of Example 1, wherein the set of predetermined criteria comprise at least one of: an optic differential, a motion differential, an audio property, a received power signal, a received communication message, an awake message, a user activity, a temperature differential, or a distance of the biological presence associated with the optic differential, the motion differential, the audio property, or the temperature differential.

Example 3 includes the subject matter of any one of Examples 1-2, including or omitting any elements as optional, wherein the set of modem parameters comprise at least one of: a transmission property of a physical layer, a frequency band, an amount of airtime, a directivity pattern, a physical connection, a medium of communication or a standard of communication.

Example 4 includes the subject matter of any one of Examples 1-3, including or omitting any elements as optional, wherein the one or more processors are further configured to: return the set of modem parameters from a second set of modem parameters to a first set of modem parameters operational before any modification with the biological presence still detected in response to a priority or a weighting of a corresponding wireless device or of a task of the corresponding wireless device.

Example 5 includes the subject matter of any one of Examples 1-4, including or omitting any elements as optional, wherein the one or more processors are further configured to: reduce the amount of RF energy below the predetermined threshold by providing an alternative communication path with less RF energy, wherein the alternative communication path comprises a handover to another modem connection.

Example 6 includes the subject matter of any one of Examples 1-5, including or omitting any elements as optional, wherein the one or more processors are further configured to: reduce the amount of RF energy below the predetermined threshold by providing an alternative communication path with less RF energy, wherein the alternative communication path comprises at least one of: a visible light communication (VLC) and configured to transmit data in lieu of the radio frequency interface and receive data via the radio frequency interface, or a wired communication line.

Example 7 includes the subject matter of any one of Examples 1-6, including or omitting any elements as optional, wherein the one or more processors are further configured to: monitor at least one of: protocol or application layer information; and classify wireless activity based on non-deferrable activity, long-term deferrable activity, and short-term deferrable activity based on the at least one of: the protocol or the application layer information, wherein the set of modem parameters comprise at least one of: a total amount of data to be transferred, an upper time bound for execution, or a minimum transmission rate, related to the wireless activity.

Example 8 is a system of a wireless network comprising: a first wireless modem configured to communicatively couple a number of user devices to a wireless network; a detection component configured to detect whether a biological presence is within a proximity to the first wireless modem based on a set of predetermined criteria; and a control component configured to modify a set of modem parameters of the first wireless modem from a nominal transmission operation in response to the detection component detecting the biological presence within the proximity.

Example 9 includes the subject matter of Example 8, further comprising at least one of: an optical sensor configured to detect an optic differential; an audio sensor configured to detect an audio property or an audio command; or a motion sensor configured to detect a movement associated with the biological presence; wherein the set of predetermined criteria comprise at least one of: an optic differential, a motion differential, an audio property, a received power signal, a received communication message, an awake message, a temperature differential, a user activity, or a distance of the biological presence associated with the optic differential, the motion differential, the audio property, or the temperature differential.

Example 10 includes the subject matter of any one of Examples 8-9, including or omitting any elements as optional, wherein the control component is further configured to reduce an amount of transmitted radio frequency (RF) energy below a predetermined threshold in response to a modification of the set of modem parameters.

Example 11 includes the subject matter of any one of Examples 8-10, including or omitting any elements as optional, wherein the control component is further configured to reduce the amount of the transmitted RF energy by modifying at least one of: a fragmentation size of data packets, a transmission power, a re-try count for retransmissions, or a directivity pattern.

Example 12 includes the subject matter of any one of Examples 8-11, including or omitting any elements as optional, wherein the set of modem parameters comprise at least one of: the number of the user devices communicatively coupled to the first wireless modem, a transmission property of a physical layer, an RF energy, a frequency, a wavelength, an amount of airtime, a directivity pattern of a transmission operation, a wireless connection or a physical connection to a wireless interface between a user device and the first wireless modem.

Example 13 includes the subject matter of any one of Examples 8-12, including or omitting any elements as optional, wherein the wireless connection or the physical connection comprises a connection to a second wireless modem at a different location within the wireless network than the first wireless modem.

Example 14 includes the subject matter of any one of Examples 8-13, including or omitting any elements as optional, further comprising: a radio frequency interface configured to receive or transmit data over a radio interface between the first wireless modem and a user device; and an optical interface configured to transmit the data over an optical interface from the first wireless modem to the user device.

Example 15 includes the subject matter of any one of Examples 8-14, including or omitting any elements as optional, wherein the control component is further configured to classify the nominal transmission operation into a set of categories comprising: a non-deferrable activity, a long-term deferrable activity, and a short-term deferrable activity based on the set of modem parameters, wherein the set of modem parameters comprise at least one of: a total amount of data to be transferred, an upper time bound for execution, or a minimum transmission rate, related to the nominal transmission operation.

Example 16 includes the subject matter of any one of Examples 8-15, including or omitting any elements as optional, wherein the control component is further configured to select a policy based on a detection of the biological presence, wherein the policy is selected from among a set of policies comprising a first action to suspend an amount of transmitted radio frequency (RF) energy of the first wireless modem, a second action to connect a user device to a second wireless modem, and third action comprising altering a wireless local area network connection to a powerline communication connection, a wired Ethernet connection or a visible light communication connection.

Example 17 includes the subject matter of any one of Examples 8-16, including or omitting any elements as optional, wherein the control component is further configured to suspend another transmission operation with a lower RF energy to the nominal transmission operation based on a priority of a task or a user device over another task or another user device.

Example 18 includes the subject matter of any one of Examples 8-17, including or omitting any elements as optional, wherein the detection component is further configured to determine the proximity of the biological presence from an operation of a user device based on a signal strength measure from the user device.

Example 19 includes the subject matter of any one of Examples 8-18, including or omitting any elements as optional, wherein the control component is further configured to modify the number of user devices communicatively coupled to the first wireless modem by handing over a user device from being communicatively coupled to the first wireless modem to a second wireless modem.

Example 20 is a computer-readable storage medium storing executable instructions that, in response to execution, cause one or more processors of a wireless network to perform operations comprising: communicatively coupling a user device to a wireless network via a network device; detecting whether a biological presence is within a proximity to the network device based on a set of predetermined criteria; and modifying a set of parameters of the network device in response to a detection of the biological presence within the proximity.

Example 21 includes the subject matter of Example 20, wherein the operations further comprise: reducing an amount of transmitted radio frequency (RF) energy of the network device in response to a modification of the set of parameters, wherein the network device comprises a network modem.

Example 22 includes the subject matter of any one of Examples 20-21, including or omitting any elements as optional, wherein the operations further comprise: reducing the amount of RF energy by enabling an alternative communication path with less RF energy between the user device and the network device.

Example 23 includes the subject matter of any one of Examples 20-22, including or omitting any elements as optional, wherein the alternative communication path comprises a visible light communication (VLC) configured to transmit data in lieu of a radio frequency interface.

Example 24 includes the subject matter of any one of Examples 20-23, including or omitting any elements as optional, wherein the operations further comprise: classifying a wireless activity based on non-deferrable activity, long-term deferrable activity, and short-term deferrable activity, wherein the modifying the set of parameters is based on a classification of the wireless activity.

Example 25 includes the subject matter of any one of Examples 20-24, including or omitting any elements as optional, wherein the operations further comprise: reducing the amount of RF energy of the network device by modifying at least one of: a fragmentation size of data packets, a transmission power, a re-try count for retransmissions, or a directivity pattern, as the set of parameters.

Example 26 is an apparatus employed in a modem device, comprising: means for communicatively coupling a user device to a wireless network via a network device; means for detecting whether a biological presence is within a proximity to the network device based on a set of predetermined criteria; and means for modifying a set of parameters of the network device in response to a detection of the biological presence within the proximity.

Example 27 includes the subject matter of Example 26, further comprising: means for reducing an amount of transmitted radio frequency (RF) energy of the network device in response to a modification of the set of parameters, wherein the network device comprises a network modem.

Example 28 includes the subject matter of any one of Examples 26-27, including or omitting any elements as optional, further comprising: means for reducing the amount of RF energy by enabling an alternative communication path with less RF energy between the user device and the network device.

Example 29 includes the subject matter of any one of Examples 26-28, including or omitting any elements as optional, wherein the alternative communication path comprises a visible light communication (VLC) configured to transmit data in lieu of a radio frequency interface.

Example 30 includes the subject matter of any one of Examples 26-29, including or omitting any elements as optional, further comprising: means for classifying a wireless activity based on non-deferrable activity, long-term deferrable activity, and short-term deferrable activity, wherein the modifying the set of parameters is based on a classification of the wireless activity.

Example 31 includes the subject matter of any one of Examples 26-30, including or omitting any elements as optional, further comprising: means for reducing the amount of RF energy of the network device by modifying at least one of: a fragmentation size of data packets, a transmission power, a re-try count for retransmissions, or a directivity pattern, as the set of parameters.

Example 32 is a wireless modem device, comprising: a detection circuit configured to detect whether a human or animal is close to the modem device according to a predetermined criterion; and a control circuit configured to take an alternative action for a transmission operation from a nominal transmission operation if the detection circuit detects the human or animal is close to the modem device.

Example 33 includes the subject matter of Example 32, wherein the wireless modem device comprises a smart phone or a tablet device, and wherein the detection circuit comprises a gyro sensor, a camera or circuitry that detects human user activity of the smart phone or tablet device.

Example 34 includes the subject matter of any one of Examples 32-33, including or omitting any elements as optional, wherein the wireless modem device comprises a laptop computer or a desktop computer, and wherein the detection circuit comprises a camera or circuitry that detects human user activity of the laptop computer or desktop computer.

Example 35 includes the subject matter of any one of Examples 32-34, including or omitting any elements as optional, wherein the wireless modem device comprises a digital assistant device or a smart television in the detection circuit comprises a microphone array.

Example 36 includes the subject matter of any one of Examples 32-35, including or omitting any elements as optional, wherein the wireless modem device comprises an intelligent light device, and wherein the detection circuit comprises a passive infrared sensor (PIR) or a movement sensor.

Example 37 includes the subject matter of any one of Examples 32-36, including or omitting any elements as optional, wherein the wireless modem device comprises a stationary device and wherein the detection circuit comprises a charged coupled device (CCD) camera configured to detect movement in a field of view of the CCD camera.

Example 38 includes the subject matter of any one of Examples 32-37, including or omitting any elements as optional, wherein the wireless modem device comprises smart TV, and wherein the detection circuit comprises a receive signal strength indicator (RSSI) sensor configured to ascertain a distance of a user operating and associated remote control device from a detected RSSI signal therefrom.

Example 39 includes the subject matter of any one of Examples 32-38, including or omitting any elements as optional, wherein close to the modem device according to the predetermined criteria comprises detecting a presence of a human or an animal in a room in which the wireless modem device resides.

Example 40 includes the subject matter of any one of Examples 32-39, including or omitting any elements as optional, wherein close to the modem device according to the predetermined criteria comprises detecting a presence of a human or an animal within a predetermined distance from the wireless modem device.

Example 41 includes the subject matter of any one of Examples 32-40, including or omitting any elements as optional, wherein the control circuit further comprises a classification circuit configured to classify the transmission operation into 2 or more activity classes, wherein a first activity class comprises an activity that cannot be deferred to a later time period, and a second activity class the can be deferred to the later time period.

Example 42 includes the subject matter of any one of Examples 32-41, including or omitting any elements as optional, wherein the control circuit is configured to take an alternative action of deferring the transmission operation in response to the classification circuit classifying the nominal transmission operation and the second activity class.

Example 43 includes the subject matter of any one of Examples 32-42, including or omitting any elements as optional, wherein the classification circuit is further configured to classify a transmission operation based on at least one of: a total amount of data to be transferred, an upper time bound for an exemption of the transmission operation, or a minimum transmission rate requirement of the transmission operation.

Example 44 includes the subject matter of any one of Examples 32-43, including or omitting any elements as optional, wherein the control circuit is configured to take an alternative action for the transmission operation by altering one or more transmission properties of the physical layer link.

Example 45 includes the subject matter of any one of Examples 32-44, including or omitting any elements as optional, wherein altering a transmission property of the physical layer link comprises the control circuit reducing a transmit power of a radio frequency transmitter circuit used perform the transmission operation.

Example 46 includes the subject matter of any one of Examples 32-45, including or omitting any elements as optional, wherein altering a transmission property of the physical layer link comprises the control circuit altering one or more of a transmission frequency band, and airtime or a directivity pattern of the transmission operation.

Example 47 includes the subject matter of any one of Examples 32-46, including or omitting any elements as optional, wherein the control circuit is configured to take an alternative action for the transmission operation by altering the communication process being employed from a wireless RF transmission to a non-wireless RF transmission.

Example 48 includes the subject matter of any one of Examples 32-47, including or omitting any elements as optional, wherein the non-wireless RF transmission comprises a power line communication (PLC), a wired ethernet communication or a visible light communication (VLC).

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the sand/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TOMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TOMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus, comprising:

a wireless component configured for wireless communication in view of a set of wireless parameters;

one or more processors configured to:

determine whether a stationary biological presence is within a proximity based on a set of predetermined criteria; and modify the set of wireless parameters that include a radio frequency (RF) parameter in response to the stationary biological presence being detected within the proximity, wherein when modifying the set of wireless parameters, the one or more processors are configured to cause a use of a different communication path for subsequent communication.

2. The apparatus of claim 1, wherein the set of wireless parameters are modified in view of a security consideration.

3. The apparatus of claim 2, wherein the security consideration includes a detection of an unknown presence within the proximity.

4. The apparatus of claim 3, the one or more processors further configured to generate an alarm responsive to the detection of the unknown presence within the proximity.

5. The apparatus of claim 3, wherein the detection of the unknown presence within the proximity includes a detection of a movement of the stationary biological presence within the proximity.

6. The apparatus of claim 1, the one or more processors further configured to further modify the set of wireless parameters in response to the stationary biological presence no longer being detected.

7. The apparatus of claim 1, wherein the stationary biological presence is detected within the proximity based on detection of at least one of: an optical change, a light differential, a signal strength change, a temperature, a user activity, a user device communication, a message, a change in an RF energy, or a change in an RF field distribution.

8. The apparatus of claim 1, wherein the set of wireless parameters include at least one of: a transmission property of a physical layer, a communication standard, a frequency band, an amount of airtime, a directivity pattern, or a physical connection.

9. A system, comprising:

a wireless component configured for wireless communication in view of a set of network parameters;

one or more processors configured to:

determine whether a stationary biological presence is within a proximity based on a set of predetermined criteria; and modify the set of network parameters that include a radio frequency (RF) parameter in response to the stationary biological presence being detected, wherein when modifying the set of network parameters, the one or more processors are configured to cause a use of a different communication path for subsequent communication.

10. The system of claim 9, wherein the set of network parameters are modified in view of a wireless characteristic.

11. The system of claim 10, wherein the wireless characteristic includes an electromagnetic field, wherein the set of network parameters are modified to reduce a magnitude of the electromagnetic field.

12. The system of claim 11, wherein the magnitude of the electromagnetic field is reduced through one or more of: selecting a particular fragmentation size of one or more data packets, selecting a lower transmission power, reducing a re-try count for a number of retransmissions, adjusting one or more directivity patterns, or one or more beamforming operations.

13. The system of claim 11, wherein the magnitude of the electromagnetic field is reduced through localization to control a wireless network to deliberately reduce the electromagnetic field in one or more certain areas of the wireless network.

14. The system of claim 13, wherein the localization is based on identifying one or more objects with a particular accuracy within the proximity.

15. The system of claim 13, wherein the localization is based on at least one of: a time of arrival estimation, or a receive signal strength (RSS) measurements.

16. The system of claim 10, wherein the set of network parameters are modified to reduce a transmit power of the wireless component.

17. The system of claim 10, wherein the set of wireless parameters are modified to adjust a communication path within a wireless network.

18. The system of claim 9, wherein the set of network parameters include at least one of: a transmission property of a physical layer, a communication standard, a frequency band, an amount of airtime, a directivity pattern, or a physical connection.

19. A non-transitory computer-readable storage medium storing executable instructions that, in response to execution, cause one or more processors to perform operations comprising:

determine whether a stationary biological presence is within a proximity based on a set of predetermined criteria; and modify a set of network parameters in response to the stationary biological presence being detected, the set of network parameters including a radio frequency (RF) parameter, wherein the operation to modify the set of network parameters includes an operation to cause a use of a different communication path for subsequent communication.

20. A method, comprising:

determining whether a stationary biological presence is within a proximity based on a set of predetermined criteria; and modifying a set of network parameters in response to the stationary biological presence being detected, wherein modifying the set of network parameters includes modifying a radio frequency (RF) parameter, wherein modifying the set of wireless parameters includes causing a use of a different communication path for subsequent communication.

* * * * *